(12) United States Patent
Mochinaga et al.

(10) Patent No.: US 9,473,759 B2
(45) Date of Patent: Oct. 18, 2016

(54) TRANSMISSION DEVICE, RECEPTION AND PLAYBACK DEVICE, TRANSMISSION METHOD, AND RECEPTION AND PLAYBACK METHOD

(75) Inventors: Kazuhiro Mochinaga, Hyogo (JP); Tomoki Ogawa, Osaka (JP); Hiroshi Yahata, Osaka (JP); Yasushi Uesaka, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 358 days.

(21) Appl. No.: 14/129,212

(22) PCT Filed: Jun. 29, 2012

(86) PCT No.: PCT/JP2012/004243
§ 371 (c)(1),
(2), (4) Date: Dec. 24, 2013

(87) PCT Pub. No.: WO2013/005406
PCT Pub. Date: Jan. 10, 2013

(65) Prior Publication Data
US 2014/0125765 A1    May 8, 2014

Related U.S. Application Data

(60) Provisional application No. 61/503,817, filed on Jul. 1, 2011.

(51) Int. Cl.
*H04N 13/04* (2006.01)
*H04N 13/00* (2006.01)
(Continued)

(52) U.S. Cl.
CPC ...... *H04N 13/0066* (2013.01); *H04N 13/0055* (2013.01); *H04N 13/0059* (2013.01);
(Continued)

(58) Field of Classification Search
CPC ................................................ H04N 21/2362
See application file for complete search history.

(56) References Cited

U.S. PATENT DOCUMENTS

2003/0048354 A1   3/2003  Takemoto et al.
2004/0148629 A1*  7/2004  Shibamiya ............ G06F 3/0481
                                                    725/53
(Continued)

FOREIGN PATENT DOCUMENTS

EP      2 352 303 A1   8/2011
JP      2003-111101    4/2003
(Continued)

OTHER PUBLICATIONS

International Search Report issued Jul. 24, 2012 in corresponding International Application No. PCT/JP2012/004243.
(Continued)

*Primary Examiner* — Sath V Perungavoor
*Assistant Examiner* — Clifford Hilaire
(74) *Attorney, Agent, or Firm* — Wenderoth, Lind & Ponack, L.L.P.

(57) ABSTRACT

To provide a transmission device that enables playback with respect to the same program in accordance with a viewer's viewing environment. The transmission device stores therein 3D access information and 2D access information respectively relating to access to a 3D stream and a 2D stream that are simulcast, and generates and transmits a data stream including the 3D access information and the 2D access information.

9 Claims, 17 Drawing Sheets

(51) Int. Cl.
   *H04N 21/434*  (2011.01)
   *H04N 21/81*   (2011.01)
   *H04N 21/2362* (2011.01)
(52) U.S. Cl.
   CPC ...... *H04N13/0454* (2013.01); *H04N 21/2362* (2013.01); *H04N 21/4345* (2013.01); *H04N 21/816* (2013.01)

(56) References Cited

U.S. PATENT DOCUMENTS

| | | | | |
|---|---|---|---|---|
| 2006/0171390 | A1* | 8/2006 | La Joie | H04L 12/2801 370/390 |
| 2010/0323609 | A1 | 12/2010 | Aramaki | |
| 2011/0043614 | A1* | 2/2011 | Kitazato | H04N 13/0059 348/51 |
| 2011/0115888 | A1* | 5/2011 | Matsumoto | H04N 13/0066 348/51 |
| 2011/0119709 | A1* | 5/2011 | Kim | H04N 13/004 725/39 |

FOREIGN PATENT DOCUMENTS

| | | |
|---|---|---|
| JP | 3789794 | 6/2006 |
| JP | 2011-4036 | 1/2011 |
| JP | 2011-66871 | 3/2011 |
| JP | 2011-82666 | 4/2011 |
| JP | 2011-124971 | 6/2011 |

OTHER PUBLICATIONS

Operational Guidelines for Digital Terrestrial Television Broadcasting, Arib Technical Report, Arib TR-B14, Mar. 28, 2011 (with partial English translation).

* cited by examiner

FIG. 15

| EPG | TV station A | |
|---|---|---|
| | Service 1 | Service 2 |
| 18:00 | | |
| 19:00 | 601 "Baseball Game" (2D Program) | 602 "Baseball Game" (3D Program) |
| 20:00 | | |
| 21:00 | | |

600

TRANSMISSION DEVICE, RECEPTION AND PLAYBACK DEVICE, TRANSMISSION METHOD, AND RECEPTION AND PLAYBACK METHOD

This application is the National Stage of International Application No. PCT/JP2012/004243, filed Jun. 29, 2012, which claims the benefit of U.S. Provisional Application No. 61/503,817, filed Jul. 1, 2011.

TECHNICAL FIELD

The present invention relates to a device that transmits both a 2D stream and a 3D stream with respect to the same program, and a device that receives and plays back the 2D stream and the 3D stream.

BACKGROUND ART

Progress in digitization of TV broadcasting encourages broadcasting in higher image quality and introduction of programs for 3D viewing (hereinafter, referred to as 3D programs). A major 3D playback mode employed for 3D programs is the SBS (Side-By-Side) mode (see Patent Literature 1).

In the SBS mode, a broadcasting station (transmission device) transmits images each composed of a pair of a left-view image and a right-view image which are separately compressed to ½ in the horizontal direction and disposed next to each other. A receiver (digital TV receiver) capable of playing back 3D images separates the received images into left-view images and right-view images, and decompresses and alternatively plays back (displays) left-view images and right-view images.

The SBS mode involves image compression of two images (a left-view image and a right-view image) to ½ in the horizontal direction. Basically, the images can therefore be seen as 3D images only with the resolution of half HD.

One mode to realize viewing of 3D images with the resolution of full HD is to separately transmit left-images and right-view images with the resolution of full HD. According to this mode, however, transmission of two independent video streams requires a significantly wide bandwidth. One of examples of this mode is an MPEG4-MVC (Multiview Video Coding) mode (hereinafter, referred to as MVC mode). According to the MVC mode, efficient compression is performed exploiting the high correlation between right-images and left-view images for 3D playback. This enables efficient transmission of full HD 3D images within an available bandwidth. Accordingly, the MVC mode is promising for a playback mode for 3D programs.

There is a possibility that 3D programs are more and more common in digital TV broadcasting, and 3D compatible digital TV receivers for viewing 3D programs are becoming widespread in households.

CITATION LIST

Patent Literature

[Patent Literature 1] Japanese Patent No. 3789794

SUMMARY OF INVENTION

Technical Problem

However, since the environment for viewing 3D programs is not established in all households, viewers without 3D viewing environment cannot view stereoscopic programs even if 3D programs are broadcast.

In view of this, the present invention aims to provide a transmission device, a reception and playback device, a transmission method, and a reception and playback method that enable playback with respect to the same program in accordance with a users' viewing environment.

Solution to Problem

In order to achieve the above aim, the present invention provides a transmission device comprising: a storage unit that stores therein 3D access information and 2D access information respectively corresponding to a 3D stream and a 2D stream that are simulcast; and a transmission unit configured to transmit the 3D access information and the 2D access information.

Advantageous Effects of Invention

With the above structure, the transmission device outputs both the 3D access information and the 2D access information relating to simulcast. Accordingly, a device that plays back 2D streams uses the 2D access information, and a device that plays back 3D streams uses the 3D access information. This realizes playback in accordance with each user's viewing environment.

BRIEF DESCRIPTION OF DRAWINGS

FIG. 15 shows an example of an EPG 600 displayed by the reception and playback device 200.

DESCRIPTION OF EMBODIMENTS

1. Expertise for which the Present Invention is Based

Although 3D compatible digital TV receivers for viewing 3D programs are becoming widespread in households as explained above, all the households are not in viewing environments where 3D programs can be viewed.

When a 3D program is selected as a program to be viewed via a user's operation, a digital TV receiver not supporting 3D viewing has to perform 2D playback of a video which is broadcast as a 3D program.

For example, in the case where a 3D program of the SBS mode is played back by a conventional 2D digital TV receiver not supporting 3D playback, a left-view image and a right-view image appear side by side on the screen without being separated from each received image. Alternatively, each received image is separated into a left-view image and a right-view image, and either of the left-view images or the right-view images (for example, the left-view images) are doubled in the horizontal direction for display.

However, as described above, the SBS mode involves compression of two types images (a left-view image and a right-view image) to ½ in the horizontal direction, and accordingly these images have a resolution which is half the resolution of full HD. As a result, the former example means that images resulting from compression and transformation of original images to halves are presented to users, whereas the latter example means that images with resolution degraded as a result of enlargement are presented to users. Neither of the above examples achieves to present 2D images with full HD which should inherently be ensured in users' viewing environment.

It is natural that viewers hope to view a video with the original resolution (full HD) that is inherent in 2D playback. For example, it is expected that viewers without 3D viewing environment desire to view a video which is broadcast as a 3D program, not as a 3D program but as a 2D program. Accordingly, there is a demand for broadcasting stations to provide broadcasting such that viewers with TV receivers not supporting 3D playback can view 2D video contents in a conventionally available manner.

As a result of earnest investigation in view of this, the inventors made the present invention that enables playback with respect to the same program in accordance with a viewer's viewing environment.

One aspect of the present invention provides a transmission device comprising: a storage unit that stores therein 3D access information and 2D access information respectively corresponding to a 3D stream and a 2D stream that are simulcast; and a transmission unit configured to transmit the 3D access information and the 2D access information.

2. Embodiment

The following explains in detail the present embodiment with reference to the drawings.

2.1 Outline

Figure 1:
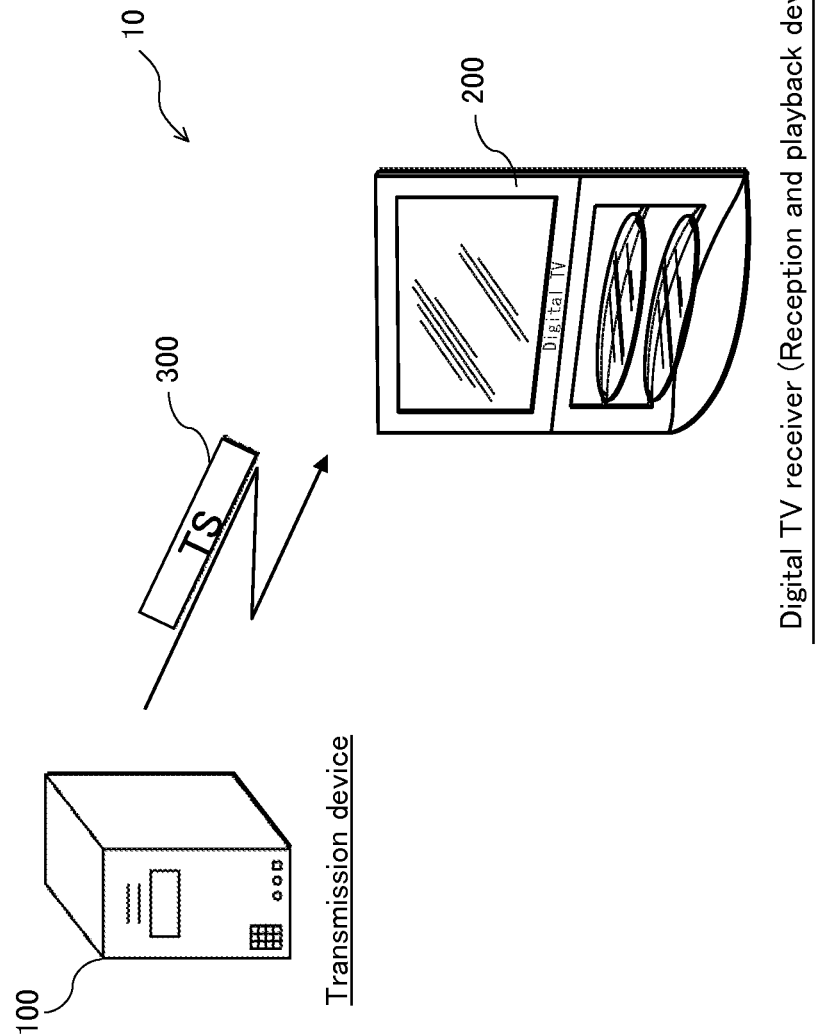
FIG. 1 shows a structure of a program distribution system 10.

A program distribution system 10 relating to the present embodiment includes a transmission device (broadcasting station) 100 and a digital TV receiver (reception and playback device) 200 as shown in FIG. 1.

In digital TV broadcasting, a broadcast signal from the transmission device 100 carries video and audio streams and program organization information multiplexed into a transport stream (TS) according to the format defined by the MPEG standard. Here, the program organization information is PSI (Program Specific Information)/SI (Service Information) describing information about TS transmission network, detail information of broadcasting stations and channels (services), and detail information of broadcast programs.

The transmission device 100 transmits a TS 300 into which a video stream, an audio stream, and so on are multiplexed. In the present embodiment, the TS 300 transmitted by the transmission device (broadcasting station) 100 is a transport stream compliant with MPEG2-TS as in conventional 2D digital broadcasting. An MPEG2-TS compliant transport stream includes one or more video and audio streams and PSI describing to which program each video and audio stream belongs. A PSI includes a PAT (Program Association Table) which is a listing of programs included in the MPEG2-TS compliant transport stream, a PMT (Program Map Table) which is a listing of PIDs (packet IDs) of video and audio streams belonging to the respective programs.

The MPEG2-TS compliant transport stream further includes SI describing network information, service channel information, and program information.

An SI includes tables such as an NIT (Network Information Table), an SDT (Service Description Table), and an EIT (Event Information Table).

An NIT includes information relating to the networks via which the TS is transported (channel number, modulation method, and so on).

An SDT includes information relating to service channels in the TS (channel name, type of program information, digital copy control information, and so on).

An EIT includes information relating to the details of programs broadcast on each service channel (program title, broadcasting date and time, details of program content, and so on).

Broadcasting receivers such as digital TV receivers generate an EPG (Electronic Program Guide) with use of the information described in the SI.

The descriptors on each SI are used according to the standards employed in each country. The present embodiment follows the rules and standards according to the ARIB (Association of Radio Industries and Businesses) employed in Japan to suggest a method for new extension.

The reception and playback device 200 receives a TS 300 carried on a broadcast wave from a broadcasting station (transmission device 100), and separates video and audio streams multiplexed in the TS 300 from SI that includes program organization information and so on.

The reception and playback device 200 generates an EPG based on information such as PS/IS of the SI which is separated. Each piece of program information included in the EPG thus generated is associated with link information to corresponding video and audio streams. By selecting a desired program on the EPG, a user can view video of the desired program along with audio. Here, the reception and playback device 200 plays back images of a video stream for 2D display, and does not support 3D display.

2.2 Structure of Transmission Device 100

With respect to one program, the transmission device 100 generates a video stream for 3D display (hereinafter, referred to as 3D video stream) and a video stream for 2D display (hereinafter, referred to as 2D video stream), and distributes the 3D video stream and the 2D video stream at the same time, thereby providing simulcast with respect to the one program.

Figure 2:
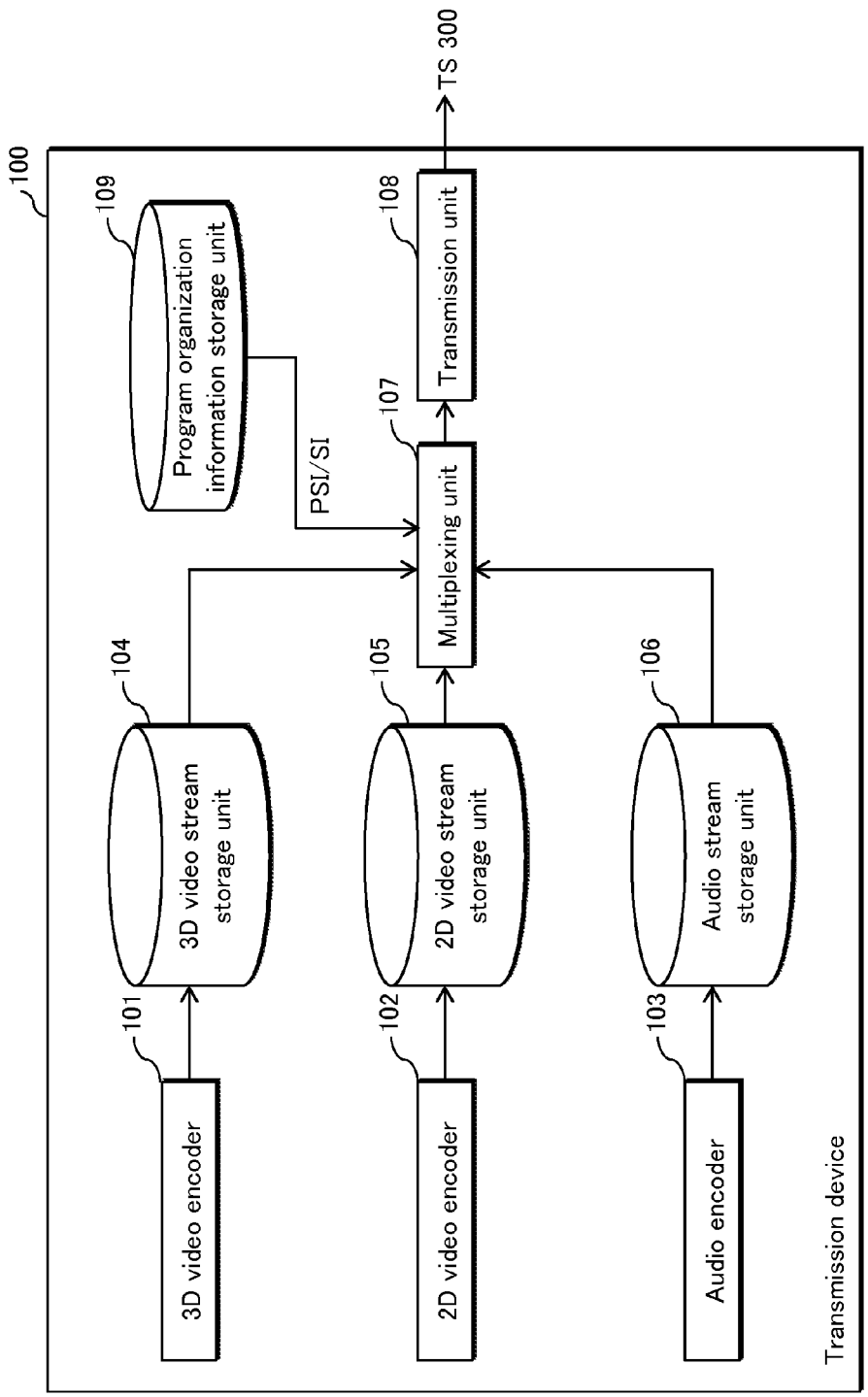
FIG. 2 is a block diagram showing a structure of a transmission device 100.

The transmission device 100 includes, as shown in FIG. 2, a 3D video encoder 101, a 2D video encoder 102, an audio encoder 103, a 3D video stream storage unit 104, a 2D video stream storage unit 105, an audio stream storage unit 106, a multiplexing unit 107, a transmission unit 108, and a program organization information storage unit 109.

(1) 3D Video Encoder 101

With respect to one program, the 3D video encoder 101 encodes a plurality of images (pictures) for 3D display according to a method such as MPEG-2 and MPEG-4 to generate a 3D video stream, and writes the generated 3D video stream into the 3D video stream storage unit 104.

Here, the 3D video encoder 101 encodes 3D images according to the playback mode of the 3D images, for example, depending on whether the playback mode is the Side-by-Side (hereinafter, referred to as SBS) mode or the MPEG4-MVC (hereinafter, referred to just as MVC) mode. Note that encoding according to these modes is known, and accordingly explanation thereof is omitted here.

(2) 2D Video Encoder 102

With respect to the program, the 2D video encoder 102 encodes a plurality of images (pictures) for 2D display according to a method such as MPEG-2 and MPEG-4 to generate a 2D video stream, and writes the generated 2D video stream into the 2D video stream storage unit 105.

(3) Audio Encoder 103

The audio encoder 103 performs compression and encoding on audio data according to a method such as linear PCM to generate an audio stream, and writes the generated audio stream into the audio stream storage unit 106.

(4) 3D Video Stream Storage Unit 104

The 3D video stream storage unit 104 is a storage region for storing a 3D video stream generated by the 3D video encoder 101.

(5) 2D Video Stream Storage Unit 105

The 2D video stream storage unit 105 is a storage region for storing a 2D video stream generated by the 2D video encoder 102.

(6) Audio Stream Storage Unit 106

The audio stream storage unit 106 is a storage region for storing an audio stream generated by the audio encoder 103.

(7) Program Organization Information Storage Unit 109

The program organization information storage unit 109 is a storage region for storing PSI/SI.

Description of PSI/SI, particularly an SDT, an EIT, and a PMT is explained later. Note that PSI/SI may be generated by either of an external device or the transmission device 100.

(8) Multiplexing Unit 107

The multiplexing unit 107 multiplexes a 3D video stream stored in the 3D video stream storage unit 104, a 2D video stream stored in the 2D video stream storage unit 105, an audio stream stored in the audio stream storage unit 106, PSI/SI, and so on, to generate an MPEG2-TS compliant TS 300, and transmits the generated MPEG2-TS compliant TS 300 via the transmission unit 108.

Note that PSI/SI, which is multiplexed together with the above streams, is explained in detail later.

(9) Transmission Unit 108

The transmission unit 108 transmits an MPEG2-TS compliant TS generated by the multiplexing unit 107.

(10) PSI/SI

The following explains description of PSI/SI, particularly an SDT, an EIT, and a PMT, which are stored in the program organization information storage unit 109 and multiplexed together with the above streams by the multiplexing unit 107.

Figure 3:
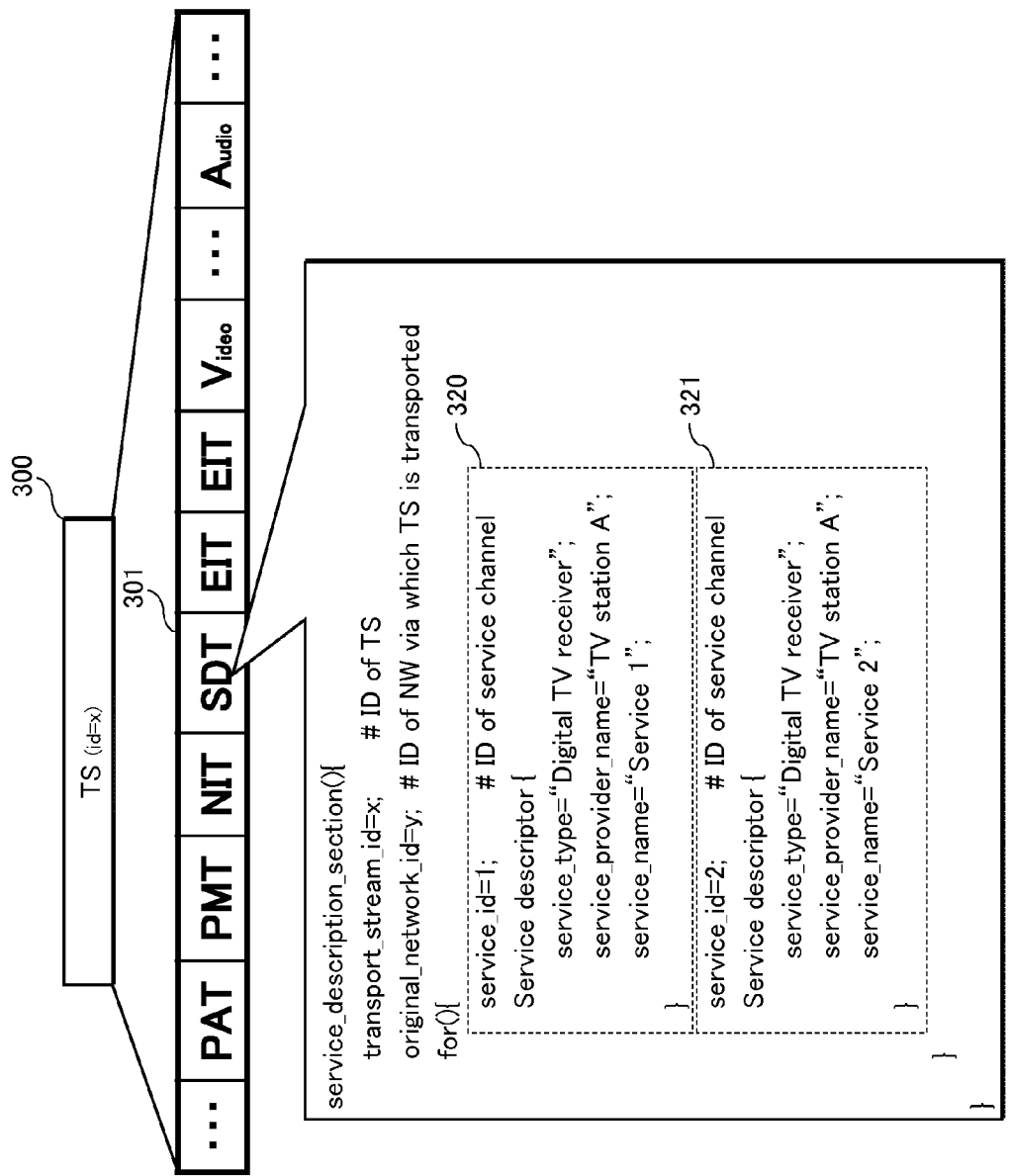
FIG. 3 shows an example of description of an SDT 301 included in a TS 300.
Figure 4:
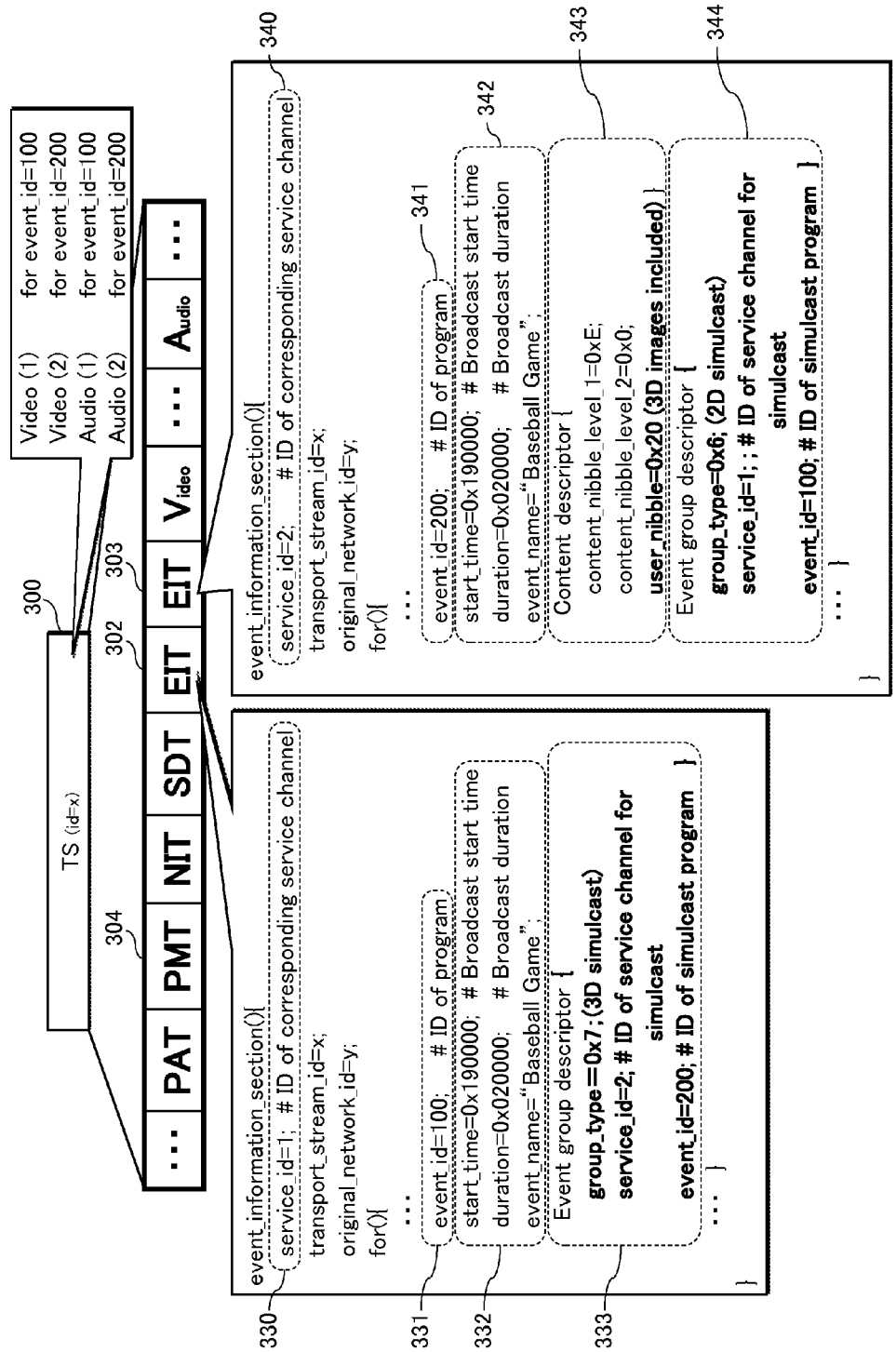
FIG. 4 shows an example of description of EITs 302 and 303 included in the TS 300.

A TS 300 generated by the multiplexing unit 107 includes, as PSI/SI, an SDT 301, an EIT 302, an EIT 303, a PMT 304, and the like as shown in FIG. 3 and FIG. 4. Programs on a plurality of service channels are multiplexed into one TS 300.

The program organization information storage unit 109 stores therein the SDT 301, the EIT 302, the EIT 303, the PMT 304, and the like which are included in a TS 300 generated by the multiplexing unit 107.

The following explains the SDT 301, the EIT 302, the EIT 303, and the PMT 304.

(10-1) SDT 301

The TS 300 shown in FIG. 3 includes two service channels, and the SDT 301 assigns a unique service_id to each service channel, and defines a separate piece of information about the service channel identified by each service_id (corresponding to descriptors 320 and 321 shown in FIG. 3).

The descriptors 320 and 321 each include, as service descriptors of a corresponding service channel, service_type indicating the broadcast mode of the service channel, service_provider_name indicating the name of the service provider, and service_name indicating the name of the service.

(10-2) EITs 302 and 303

The following explains the EITs 302 and 303 shown in FIG. 4.

The EITs 302 and 303 are each provided for each channel, and are each a collection of pieces of program information broadcast on that channel and arranged in time sequence. service_id associates the EIT with a corresponding service channel defined in the SDT 301. Here, service_id 330 associates the EIT 302 with a service channel (Service 1) indicated by the descriptor 320 shown in FIG. 3, and service_id 340 associates the EIT 303 with a service channel (Service 2) indicated by the descriptor 321 shown in FIG. 3.

Each piece of program information broadcast on a service channel is uniquely identified by event_id. For example, the service channel (Service 1) is identified by event_id 331 (having a value of 100) in the EIT 302, and the service channel (Service 2) is identified by event_id 341 (having a value of 200) in the EIT 303.

The time at which each program starts is described by "start_time", and the time period during which the program lasts is described by "duration". Both the respective programs indicated in the EITs 302 and 303 shown in FIG. 4 start at 19:00, and lasts for two hours. Also, the program title of each program is described by "event_name". Both the respective programs indicated in the EITs 302 and 303 shown in FIG. 4 have the same program title.

The descriptor relating to detail information of each program is described in each of the EITs 302 and 303 for each "event_id". Specifically, the program information for the program indicated in the EIT 303 includes a content descriptor 343 indicating "3D images included". As the content descriptor 343, information relating to the genre of an event is described. For example, by defining "content_nibble_level_1", "content_nibble_level_2", and "user_nibble", information relating to the genre of an event is identified. Here, the definition of these pieces of information is expanded, and these pieces of information are described as "content_nibble_level_1=0xE", "content_nibble_ level_2=0x0", and "user_nibble=0x20", respectively. As a result, the program indicated in the EIT 303, namely, the program identified by event_id=200 includes 3D images.

The respective programs indicated in the EITs 302 and 303 are the same program in terms of content. However, while the program (stream) indicated in the EIT 302 is broadcast as a 2D program, the program (stream) indicated in the EIT 303 is broadcast as a 3D program. That is, the two programs are simulcast in different broadcast modes.

The EITs 302 and 303 include, as information associating programs that are simulcast with each other, event group descriptors 333 and 344 respectively that are each information indicating a program (stream) of a simulcast pair of 2D and 3D programs.

The conventional event group descriptor is a descriptor compliant with the ARIB standard (ARIB STD-B10) in the current 2D broadcasting. In one example, the event group descriptor is used to group a plurality of programs (events) related to one another by describing the PID which refers to the same ES in the PMTs of the related events to establish sharing of the same event among multiple services (event sharing). In another example, the event group descriptor is used to define a broadcast mode in which one program is switched to another service at some midpoint in the program for continuous viewing (event relay). Here, through expansion of this descriptor, a new descriptor associating 2D and 3D simulcast programs with each other is duly defined to provide a link therebetween.

The event group descriptors 333 and 344 each define the group type (group_type) identifying either of a 2D simulcast program or a 3D simulcast program, a channel ID (sevice_id) identifying the service channel of the identified simulcast program which is a reference destination, and the program ID (event_id) of the identified simulcast program which is the reference destination.

Note that group_type has a value identifying the service mode of the data structure to be provided. Here, group_type has a value "0x6" corresponding to a simulcast 2D program and a value "0x7" corresponding to a simulcast 3D program.

Accordingly, the event group descriptors 333 and 344 are rendered usable as link information for transition to another program that is simulcast.

(10-3) PMT 304

The PMT 304 includes information (ES information) relating to each of a 2D video stream for a 2D program identified by event_id=100, a 3D video stream for a 3D program identified by event_id=200, and respective audio streams for the 2D and 3D programs. The description of the PMT 304 is the same as conventional ones, excepting that ES information relating to a 3D program includes information indicating whether the playback mode of 3D images is the SBS mode or the MVC mode (3D playback mode) in addition to conventional description.

2.3 Reception and Playback Device 200

The reception and playback device 200 is a digital TV receiver that is not compatible with 3D display. The reception and playback device 200 receives a TS 300 transmitted from the transmission device 100, and generates images for 2D display from a video stream included in the TS 300.

Figure 5:
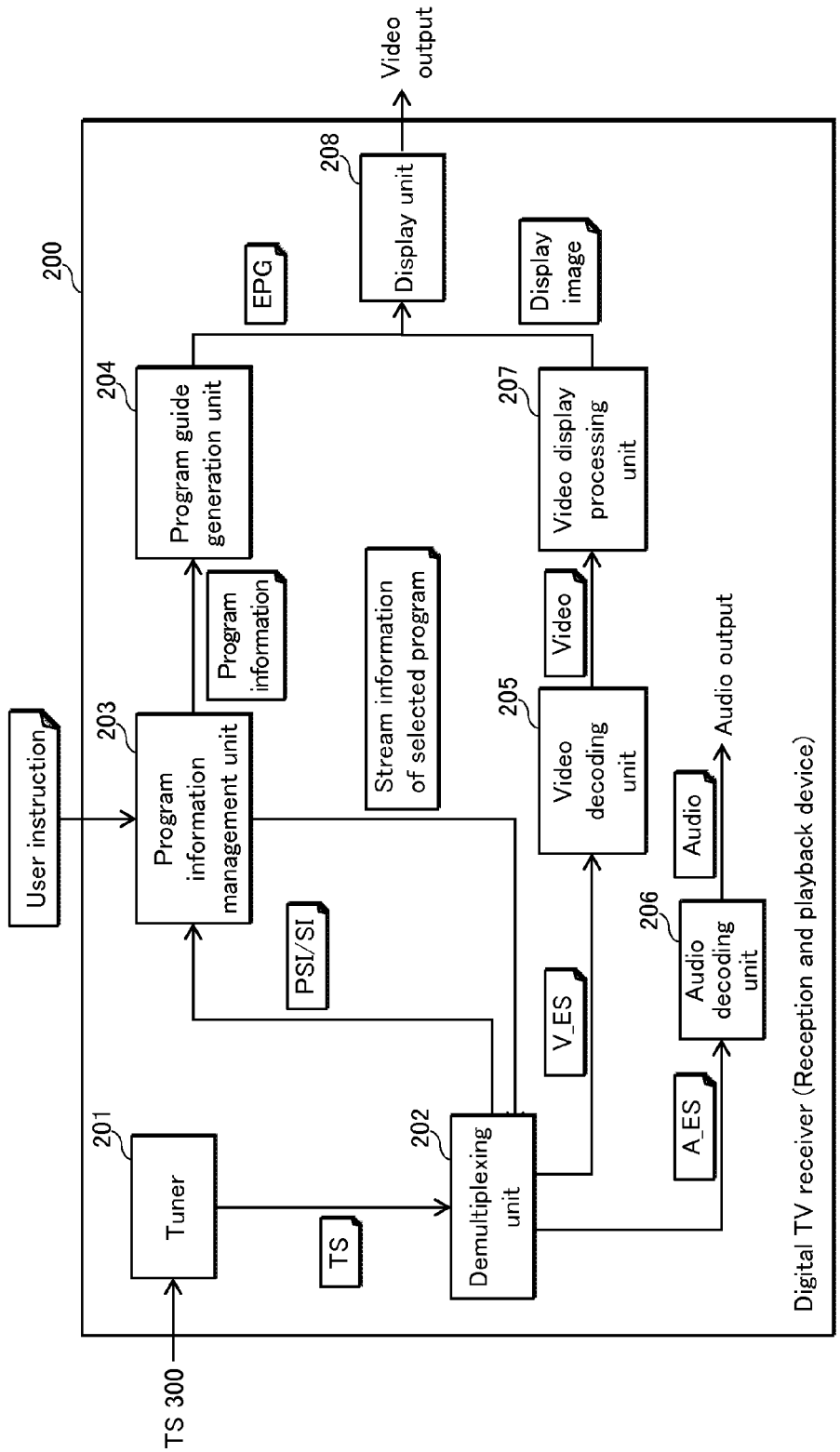
FIG. 5 is a block diagram showing a structure of a digital TV receiver (reception and playback device) 200.

The reception playback device 200 includes, as shown in FIG. 5, a tuner 201, a demultiplexing unit 202, a program information management unit 203, a program guide generation unit 204, a video decoding unit 205, an audio decoding unit 206, a video display processing unit 207, and a display unit 208.

(1) Tuner 201

The tuner 201 has a function of receiving a signal of a TS 300 carried on a digital broadcast wave which is transmitted from the transmission device 100, and demodulating the received signal.

(2) Demultiplexing Unit 202

The demultiplexing unit 202 demultiplexes the received TS 300 into a video stream (V_ES) an audio stream (A_ES), PSI/SI, and so on, and outputs the video stream, the audio stream, and the PSI/SI to the video decoding unit 1106, the audio decoding unit 206, and the program information management unit 203, respectively.

The video stream to be output to the video decoding unit 205 is selected from among one or more video streams included in the received TS 300, in accordance with stream information such as a PID of a video stream which is associated with a program selected by the program information management unit 203, which is described later. Note that the video stream includes video codec information and also includes 3D mode information if the video stream is a 3D video stream. Such information is also transferred to the video decoding unit 205. The video codec information indicates a codec method of the video stream. For example, the video codec information indicates either of the MPEG-2 method or the MPEG-4 method. Also, the 3D mode information indicates whether the 3D images are generated by the SBS mode or the MVC mode.

The audio stream to be output to the audio decoding unit 206 is selected from among one or more audio streams included in the received TS 300, in accordance with stream information such as a PID of an audio stream which is associated with a program selected by the program information management unit 203, which is described later.

The demultiplexing unit 202 extracts system packets such as PSI, SI, and a PMT from the received TS 300, acquires program information and stream information corresponding to the program from the received TS 300, and outputs the acquired program information and stream information to the program information management unit 203.

(3) Program Information Management Unit 203

The program information management unit 203 associates the program information and the stream information with each other, which are received from the demultiplexing unit 202, to manage the information in a database, and provides the program information to the program guide generation unit 204 that generates an EPG.

When a specific program is designated by a user's operation made on an EPG, the program information management unit 203 outputs the stream information that is associated with the designated program information to the demultiplexing unit 202.

Figure 6:
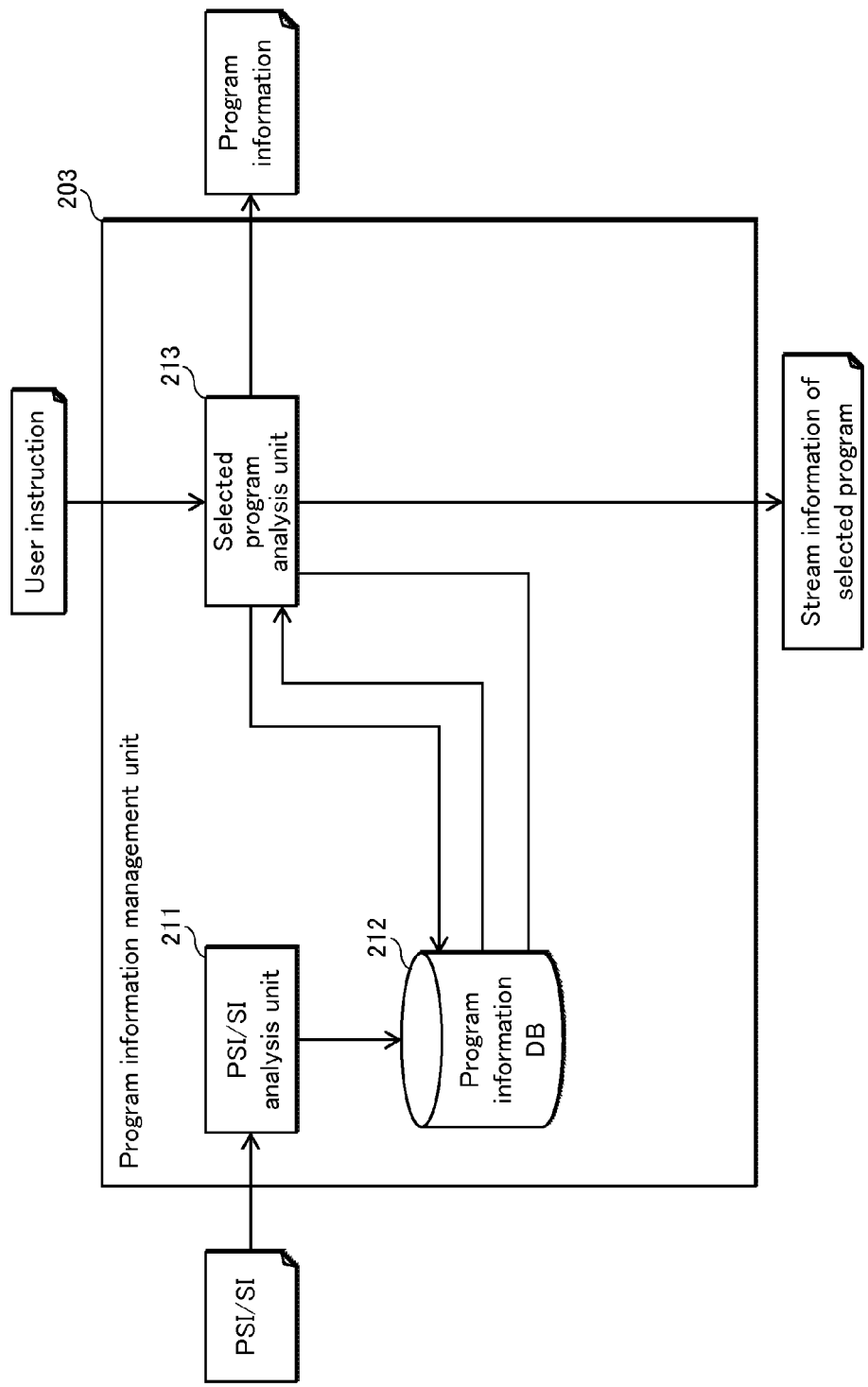
FIG. 6 is a block diagram showing a structure of a program information management unit 203.

As shown in FIG. 6, the program information management unit 203 includes a PSI/SI analysis unit 211, a program information DB 212, and a selected program analysis unit 213.

(3-1) PSI/SI Analysis Unit 211

Upon receiving PSI/SI from the demultiplexing unit 202, the PSI/SI analysis unit 211 extracts program information from the received PSI/SI, and stores the extracted program information in the program information DB 212.

For example, a PMT of PSI/SI includes PID information of a stream included in a TS and a playback mode if the stream identified by the PID information is a 3D video stream. Similarly, an SDT of PSI/SI describes service channel information of a service channel that is broadcast, and an EIT describes pieces of program information each associated with a corresponding channel. The PSI/SI analysis unit 211 acquires the information for each program from PSI/SI, and stores each piece of program information together with a corresponding piece of stream information in the program information DB 212.

(3-2) Program Information DB 212.

The program information DB 212 manages pieces of program information for each program and stream information, which are acquired by the PSI/SI analysis unit 211, in the database, and supplies a relevant piece of data at a request for program information.

Figure 7:
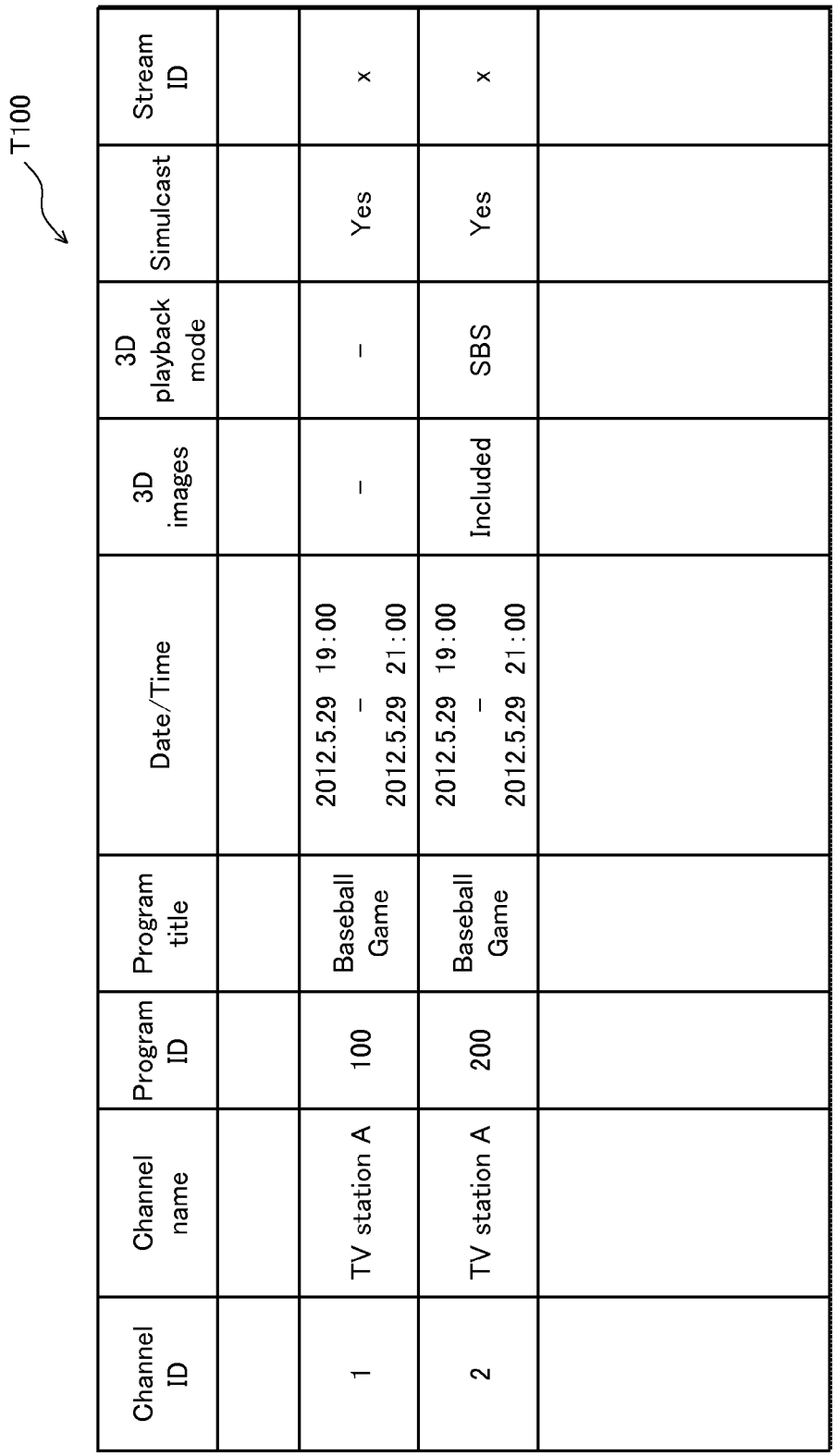
FIG. 7 shows an example of a data structure of a program information table T100.

For example, the program information DB 212 includes a program information table T100 shown in FIG. 7. The program information table T100 has a region for storing at least one combination composed of fields "Channel ID", "Channel name", "Program ID", "Program title", "Date/Time", "3D images", "3D playback mode", "Simulcast", and "Stream ID".

The field "Channel ID" describes an identifier indicating a channel on which a corresponding program is broadcasted, and the field "Channel name" describes a name of a broadcasting station of the channel. The field "Program ID" describes an identifier indicating the corresponding program, and the field "Program title" describes a title of the corresponding program. The field "Date/Time" describes date and time when the corresponding program is broadcasted. All these pieces of information are acquired from the EIT and the SDT.

The field "3D images" describes information as to whether the corresponding program includes 3D images. For purposes of description, in FIG. 7, the field "3D images" describes "-" if the corresponding program does not include 3D images, and describes "Included" if the corresponding program includes 3D images.

The field "3D playback mode" describes information identifying a playback mode if the corresponding program includes 3D images. For example, in the case where the playback mode of the 3D images is the SBS mode, information indicating the SBS mode ("SBS") is described. In the case where the playback mode of the 3D images is the MVC mode, information indicating the MVC mode ("MVC") is described. Such information is acquired from a PMT.

The field "Simulcast" describes information indicating whether the corresponding program is simulcast, and link information indicating association with another program that is simulcast if the corresponding program is simulcast. For example, in the case where the corresponding program is simulcast, the field "Simulcast" describes information indicating that the corresponding program is simulcast ("Yes"). This information is determined based on whether an event group descriptor associating another program that is simulcast is described in the EIT. In the case where the corresponding program is simulcast, an event group descriptor associating another program that is simulcast is described as link information.

The field "Stream ID" describes a stream ID allocated to the corresponding program.

(3-3) Selected Program Analysis Unit 213

When a user selects a desired program on an EPG for example, the selected program analysis unit 213 receives an instruction relating to the operation to query the program information DB 212 for program information.

The selected program analysis unit 213 queries the program information DB 212 on the program selected by the user to judge whether playback of the program is possible by the reception and playback device 200.

When judging that playback is impossible, that is, when the program selected by the user includes 3D images, the selected program analysis unit 213 checks a 3D playback mode for the selected program with the program information DB 212.

When the 3D playback mode is the MVC mode, that is, a mode compatible with 2D playback, the selected program analysis unit 213 identifies a 3D video stream to be acquired, with use of program information corresponding to the selected program including 3D images.

When the 3D playback mode is the SBS mode, the selected program analysis unit 213 checks whether a 2D program is simulcast with the selected program. On determining that a 2D program is simulcast, the selected program analysis unit 213 does not refer to the program selected by the user. Instead, the selected program analysis unit 213 refers to link information of the program information that is linked to as a corresponding 2D simulcast program (program information for 2D program), and makes another query to the program information DB 212 to identify a 2D video stream of the simulcast program to be acquired.

On determining that a corresponding 2D program is not simulcast, the selected program analysis unit 213 identifies a 3D video stream corresponding to the 3D program and the SBS mode, with use of program information corresponding to the selected program including 3D images.

In the manner described above, it is possible to realize appropriate switching between programs to be played back on a 2D digital TV receiver.

(4) Program Guide Generation Unit 204

The program guide generation unit 204 acquires program information from the program information management unit 203, and generates EPG data for presentation to the user. The EPG data thus generated is sent to the display unit 208 and displayed as an EPG on the screen upon a user request.

Figure 8:
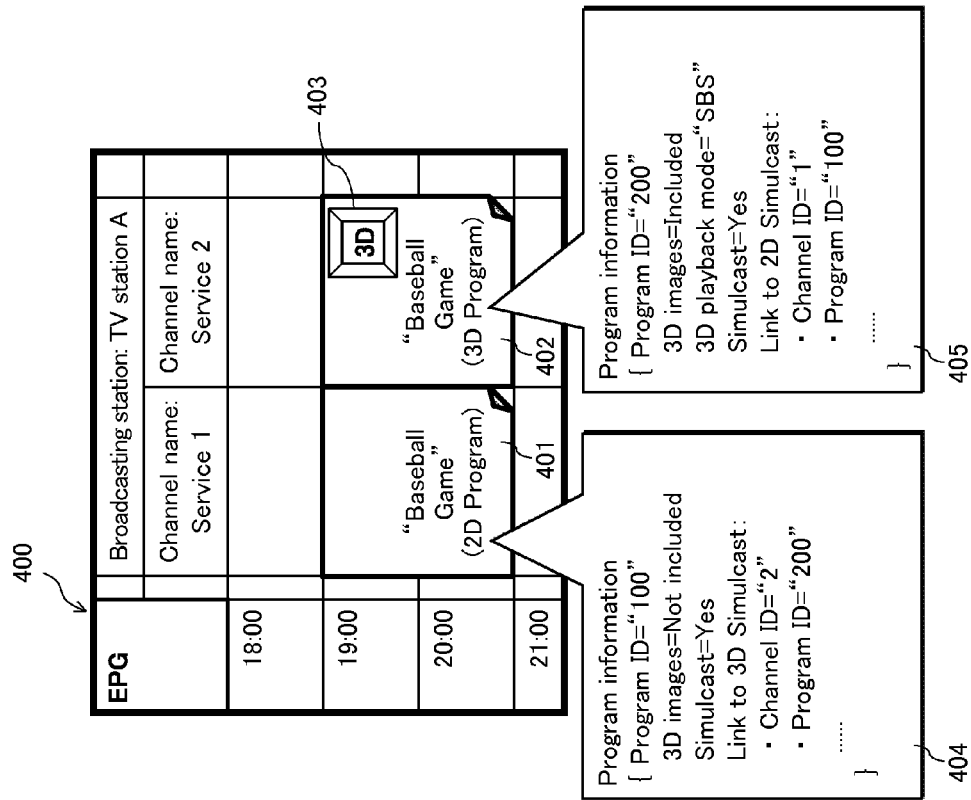
FIG. 8 shows an example of an EPG 400 displayed by the reception and playback device 200.

FIG. 8 shows an example of display of an EPG 400 while simulcast is performed.

The EPG 400 shown in FIG. 8 is generated based on the program information table T100 shown in FIG. 7. In the program information table T100, with respect to a baseball game program which is broadcast on a channel having a channel name "TV station A" from 19:00 to 21:00, simulcast of 2D and 3D programs is scheduled. Accordingly, in the EPG 400, the program title is separately displayed on fields "Service 1" and "Service 2".

Also, the information (service_provider_name and service_name) defined by the descriptors 320 and 321 shown in FIG. 3 is referenced for providing the broadcasting station name and channel (service) name in the EPG 400.

The channel Service 1 is a service channel identified by service_id=1 in the information of the SDT 301 shown in FIG. 3. In FIG. 4, programs on the channel identified by service_id=1 are described in the EIT 302. With reference to the program information identified by event_id=100 in the EIT 302, a "Baseball Game" program 401 as a 2D program appears in the EPG 400.

The channel Service 2 is a service channel identified by service_id=2 in the information of the SDT 301 shown in FIG. 3. In FIG. 4, programs on the channel identified by service_id=2 are described in the EIT 303. With reference to the program information identified by event_id=200 in the EIT 303, a "Baseball Game" program 402 as a 3D program appears in the EPG 400. Also, 3D program information 403 is displayed which indicates that the "Baseball Game" program 402 is a 3D program. Here, judgment is made as to whether to display the 3D program information 403 based on whether the content descriptor shown in FIG. 4 describes "3D images included". In the case where the reception and playback device 200 detects that the content descriptor describes "3D images included", the 3D program information 403 is displayed on the EPG 400.

Also, FIG. 8 shows program information 404 for a 2D "Baseball Game" program and program information 405 for a 3D "Baseball Game" program.

Specifically, the program information 404 is program information for the "Baseball Game" program as a 2D program, and the program information 405 is program information for the "Baseball Game" program as a 3D program.

The program information 404 for example describes, as information of the "Baseball Game" program as a 2D program, a value of "100" which is a program ID (event_id), whether 3D images are included (information indicating "Not included" here), and whether there is a corresponding simulcast program (information indicating "Included" here). Also, the program information 404 describes link information to 3D simulcast for identifying another program that is simulcast (hereinafter, referred to as 3D program link information). The program information 404 for example includes, as the 3D program link information, a channel ID (="2") and a program ID (="200") of a 3D program that is simulcast. Specifically, a 3D video stream of the simulcast 3D program is identified based on the channel ID, the program ID included in the 3D program link information and the program information table T100.

The program information 405 for example describes, as information of the "Baseball Game" program as a 3D program, a value of "200" which is a program ID (event_id), whether 3D images are included (information indicating "Included" here), and whether there is a corresponding simulcast program (information "Included" here). Also, the program information 405 describes link information to 2D simulcast for identifying another program that is simulcast (hereinafter, referred to as 2D program link information). The program information 404 for example includes, as the 2D program link information, a channel ID (="1") and a program ID (="100") of a 2D program that is simulcast. Specifically, a 2D video stream of the simulcast 2D program is identified based on the channel ID, the program ID included in the 2D program link information and the program information table T100.

As explained above, the "Baseball Game" program broadcast on Service 1 and the "Baseball Game" program broadcast on Service 2 appearing on the EPG shown in FIG. 8 are the same program in terms of content, except that the former is broadcast as a 2D program, whereas the latter as a 3D program. That is, the two programs are simulcast in different broadcast modes. By adding information associating the 2D program broadcast on Service 1 and the 3D program broadcast on Service 2 as a simulcast pair, namely, 2D program link information and 3D program link information, to program information 405 and 404, respectively, it is possible to perform playback suitable for the user's viewing environment.

(5) Video Decoding Unit 205

The video decoding unit 205 has a function of decoding a video stream (V_ES) upon receipt from the demultiplexing unit 202 and also has a function of retrieving the video codec information and 3D mode information from the video stream. The video decoding unit 205 decodes the video stream into frames.

In the case where the "3D mode information" indicates the SBS mode, the video stream is composed of frames each of which is composed of a 3D pair of a left-view image and a right-view image. In this case, the video decoding unit 205 decodes the video stream into frames as 2D frames. In other words, the decoded frames are each a video composed of a pair of a left-view image and a right-view image.

On the other hand, in the case where the "3D mode information" indicates the MVC mode, the video decoding unit 205 decodes only a base view stream multiplexed in the video stream as a 2D compatible MPEG4-AVC stream.

The video decoding unit 205 outputs the 3D mode information to the video display processing unit 207 together with the decoded frames.

(6) Audio Decoding Unit 206

The audio decoding unit 206 decodes an audio stream (A_ES) received from the demultiplexing unit 202 to generate audio data, and outputs the generated audio data as audio.

(7) Video Display Processing Unit 207

The video display processing unit 207 processes frames, which are received from the video decoding unit 205, and outputs a display image after the process to the display unit 208. Examples of the processes conducted are cropping and scaling. In addition, in the case where the 3D mode information indicates the SBS mode, the video display processing unit 207 may crop only a left-view image from each frame, which is received from the video decoding unit 205, and scale the cropped image to be as large as the entire screen to generate 2D images. Then, the video display processing unit 207 may perform the above processes on the generated 2D images for output to the display unit 208.

(8) Display Unit 208

The display unit 208 displays, on the screen, the frames after the processes received from the video display processing unit 207.

On receipt of a user's operation of requesting an EPG to be displayed, the display unit 208 receives EPG data from the program guide generation unit 204, and displays an EPG on the screen.

2.4 Operations (1) Operations of Transmission Device 100

Figure 9:
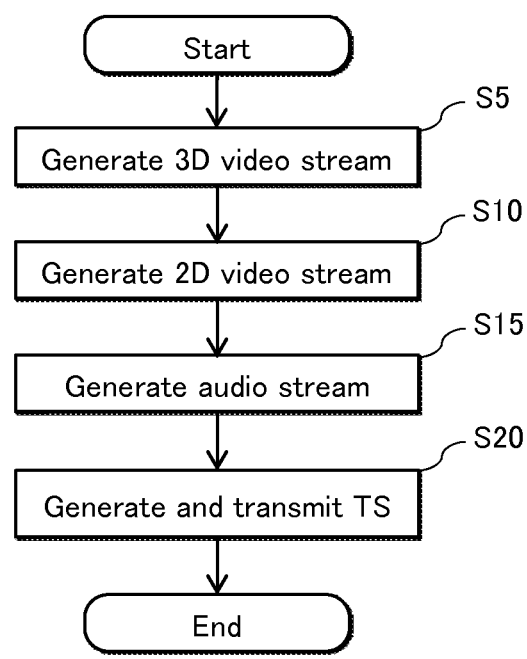
FIG. 9 is a flow chart showing operations of the transmission device 100.

Here, the operations of the transmission device 100 are explained with reference to a flow chart shown in FIG. 9.

The 3D video encoder 101 encodes a plurality of videos (pictures) for 3D display with respect to a program according to a method such as MPEG-2 and MPEG-4 to generate a 3D video stream, and writes the generated 3D video stream into the 3D video stream storage unit 104 (Step S5). The 3D video encoder 101 encodes each program according to either of the SBS mode or the MVC mode which is determined advance for the program.

The 2D video encoder 102 encodes a plurality of videos (pictures) for 2D display with respect to the program according to a method such as MPEG-2 and MPEG-4 to generate a 2D video stream, and writes the generated 2D video stream into the 2D video stream storage unit 105 (Step S10).

The audio encoder 103 performs compression and encoding on audio data to generate an audio stream, and writes the generated audio stream into the audio stream storage unit 106 (Step S15).

The multiplexing unit 107 multiplexes the 3D video stream, the 2D video stream, the audio stream, and the PSI/SI and the like stored in the program organization information storage unit 109 to generate an MPEG2-TS compliant transport stream, and transmits the generated MPEG2-TS compliant transport stream via the transmission unit 108 (Step S20).

(2) Operations of Reception and Playback Device 200

Here, the operations of the reception and playback device 200 are explained with reference to a flow chart shown in FIG. 10.

When a program is selected via a user's operation while the EPG 400 is displayed, the selected program analysis unit 213 included in the program information management unit 203 judges whether the selected program is a 2D program (Step S100). Specifically, the selected program analysis unit 213 makes the judgment based on whether program information corresponding to the selected program includes information indicating "3D images included" or "3D images not included".

If judging that the selected program is not a 2D program but a 3D program (Step S100: No), the selected program analysis unit 213 judges whether playback of the selected 3D program is possible (Step S105). Specifically, the selected program analysis unit 213 judges whether the digital TV receiver supports 3D playback. Alternatively, if the digital TV receiver supports 3D playback, the selected program analysis unit 213 further judges whether the digital TV receiver is compatible with a 3D playback mode for the selected 3D program that is currently broadcast.

If judging that playback of the selected 3D program is impossible (Step S105: No), the selected program analysis unit 213 judges whether switching to 2D viewing is to be performed (Step S110).

If judging that switching to 2D viewing is to be performed (Step S110: Yes), the selected program analysis unit 213 judges as to a playback mode of the selected 3D program, that is, judges whether the playback mode is either of the SBS mode or the MVC mode (Step S115). Specifically, the selected program analysis unit 213 makes the judgment based on information described in 3D playback mode information included in program information corresponding to the selected program.

If judging that the playback mode of the selected 3D program is the SBS mode (Step S115: SBS), the selected program analysis unit 213 judges whether a corresponding 2D program is simulcast (Step S120). Specifically, the selected program analysis unit 213 makes the judgment based on whether the program information corresponding to the selected 3D program includes information indicating that simulcast is "Included" or "Not included".

If judging that a corresponding 2D program is simulcast (Step S120: Yes), the selected program analysis unit 213 identifies a 2D video stream of the corresponding 2D simulcast program. The reception and playback device 200 plays back the identified 2D video stream, namely, the 2D program (Step S125). Specifically, the selected program analysis unit 213 identifies a 2D video stream of the simulcast 2D program based on a channel ID and a program ID included in link information to the 2D program and the program information table T100. The video decoding unit 205 decodes the identified 2D video stream, the video display processing unit 207 generates a display image from frames resulting from decoding, and the display unit 208 displays the generated display image. As a result, 2D playback is performed using the identified 2D video stream.

If judging that a corresponding 2D program is not simulcast (Step S120: No), the selected program analysis unit 213 identifies a 3D video stream of the selected 3D program. The reception and playback device 200 performs 2D playback of images of the SBS mode of the identified 3D video stream (Step S130). Specifically, the selected program analysis unit 213 identifies a 3D video stream corresponding to the selected 3D program and the SBS mode, with use of program information corresponding to the selected 3D program. The video decoding unit 205 decodes the identified 3D video stream, the video display processing unit 207 generates a display image from frames resulting from decoding, and the display unit 208 displays the generated display image. As a result, 2D playback is performed using the identified 3D video stream. In other words, the video decoding unit 205 and the video display processing unit 207 play back the identified 3D video stream. Here, the frames resulting from decoding by the video decoding unit 205 are each a frame composed of a pair of a left-view image and a right-view image.

If judging that the playback mode of the selected 3D program is the MVC mode (Step S115: MVC), the selected program analysis unit 213 identifies a 3D video stream of the selected 3D program. The reception and playback device 200 performs 2D playback using base view frames included in the identified 3D video stream (Step S135). Specifically, the selected program analysis unit 213 identifies a 3D video stream to be acquired, with use of the program information corresponding to the selected 3D program. The video decoding unit 205 decodes the identified 3D video stream, the video display processing unit 207 generates a display image from frames resulting from decoding, and the display unit 208 displays the generated display image. As a result, 2D playback is performed using the identified 3D video stream. In other words, the video decoding unit 205 and the video display processing unit 207 play back the identified 3D video stream. Here, the frames decoded by the video decoding unit 205 are each a left-view image.

Also, if judging that switching to 2D viewing is not to be performed (Step S110: No), the selected program analysis unit 213 displays an error message indicating that playback is impossible for notification to the user (Step S140).

If judging that playback of the selected 3D program is possible (Step S105: Yes), the selected program analysis unit 213 identifies a 3D video stream of the selected 3D program. The reception and playback device 200 performs 3D playback using the identified 3D video stream (Step S145).

(3) Specific Examples

Here, specific examples of the operations of the reception and playback device 200 are explained with reference to the EPG 400 shown in FIG. 8.

When a user selects the 2D "Baseball Game" program broadcast on Service 1, judgment is made in Step S100 and processing proceeds to Step S125. The 2D program broadcast on Service 1 is played back for viewing as in the conventional manner.

On the other hand, when the user selects the 3D "Baseball Game" program broadcast on Service 2, the judgments are made in Steps S100, S105, and S110 in this order, and then judgment is made in Step S115.

If the result of the judgment in Step S115 indicates that the playback mode of the 3D program is the MVC mode (Step S115: MVC), the reception and playback device 200 performs 2D playback solely using the base view stream displayed as left-view images (Step S135).

If the result of the judgment in Step S115 indicates that the playback mode of the 3D program is the SBS mode (Step S115: SBS), the reception and playback device 200 judges whether a corresponding 2D program (the 2D "Baseball Game" program) is simulcast (Step S120).

If judging that the corresponding 2D program is simulcast (Step S120: Yes), the reception and playback device 200 switches to playback of the 2D "Baseball Game" program broadcast on Service 1 for provision to the user in Step S125, with reference to link information to a simulcast program (for example, information of "channel ID" and "program ID") which is described in the program information of the "Baseball Game" program broadcast on Service 2.

If judging that no corresponding 2D program is simulcast (Step S120: No), a video of the SBS mode broadcast on Service 2 is presented for 2D viewing in Step S130.

Steps S120, S125, and S130 are performed for the following reason. In the 3D broadcasting according to the SBS mode, left and right images having a resolution reduced to ½ are broadcast in the same method as the conventional 2D broadcasting. As a result, the resolution of full HD inherent in 2D playback cannot be ensured. This is the reason for the above. In view of this, in order to solve the above problem to enable 2D viewing of a 3D broadcast according to the SBS mode with the resolution of full HD, the broadcasting station transmits a simulcast 2D program on Service 1 with the resolution of full HD, and the reception and playback device 200 switches to playback of the simulcast 2D program.

Also, Steps S115 and S135 are performed for the following reason.

According to the MVC mode, a distributed video stream of a 3D program is composed of encoded HD×2 streams (base view stream and non base view stream). The base view stream is independently decodable. Accordingly, a resolution in playback of the base view stream is equivalent to the resolution of full HD inherent in 2D playback. Playback of the base view stream ensures a resolution equivalent to a resolution in playback of a 2D stream. This is the reason for the above. As described above, according to the MVC mode compatible with 2D playback, it is possible to play back a 3D program for 2D viewing appropriately in accordance with the user's viewing environment. This enables playback of images of the 3D program broadcast on Service 2 for 2D viewing.

2.5 Modification 1

In the above embodiment, one TS 300 includes two service channels. However, the present invention is not limited to this structure.

It is not necessary that simulcast programs are carried in one TS, and may alternatively be carried in separate TSs.

Figure 11:
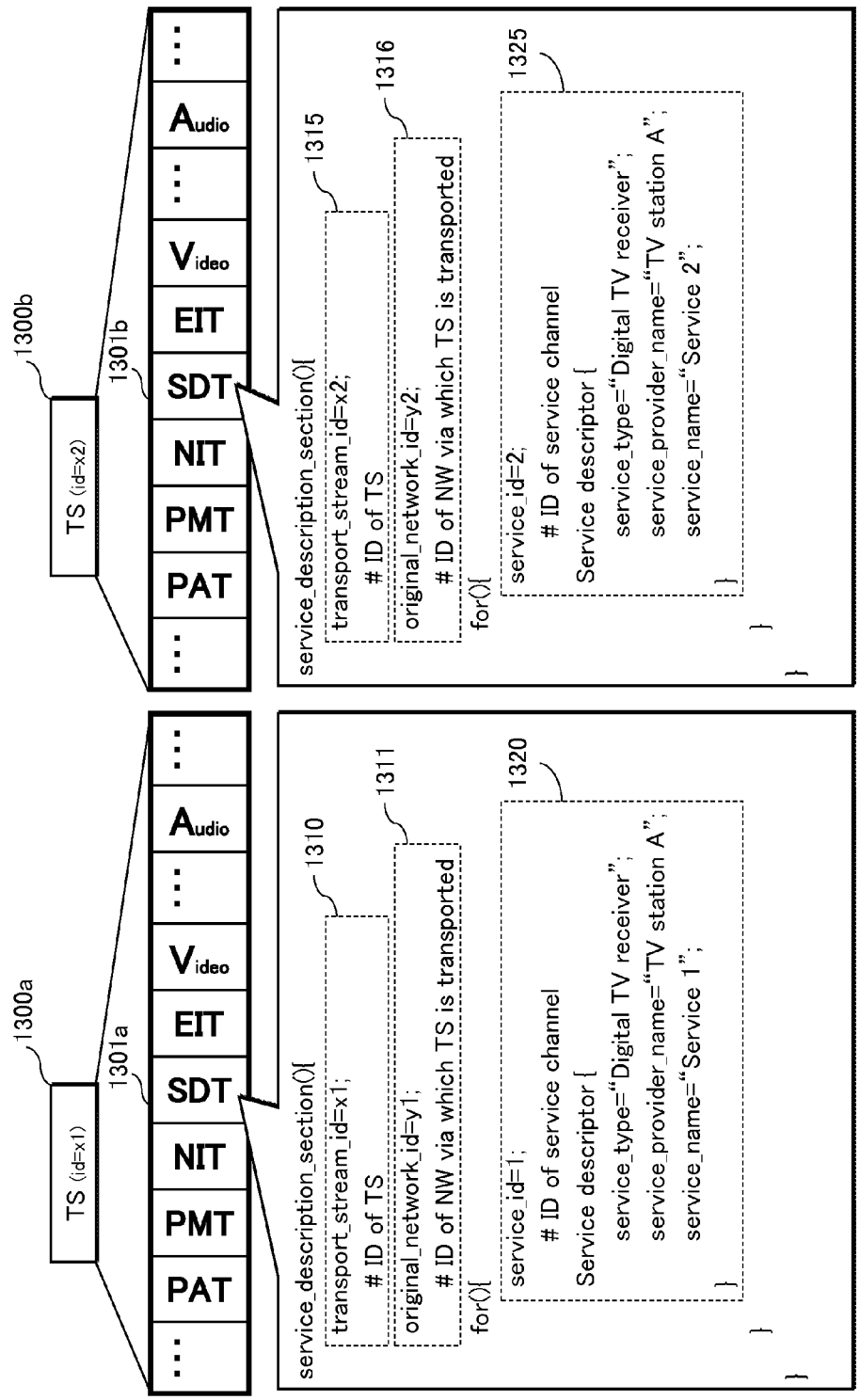
FIG. 11 shows an example of descriptions of SDTs 1301a and 1301b in the case where two simulcast programs are carried on separate TSs (TSs 1300a and 1300b).
Figure 12:
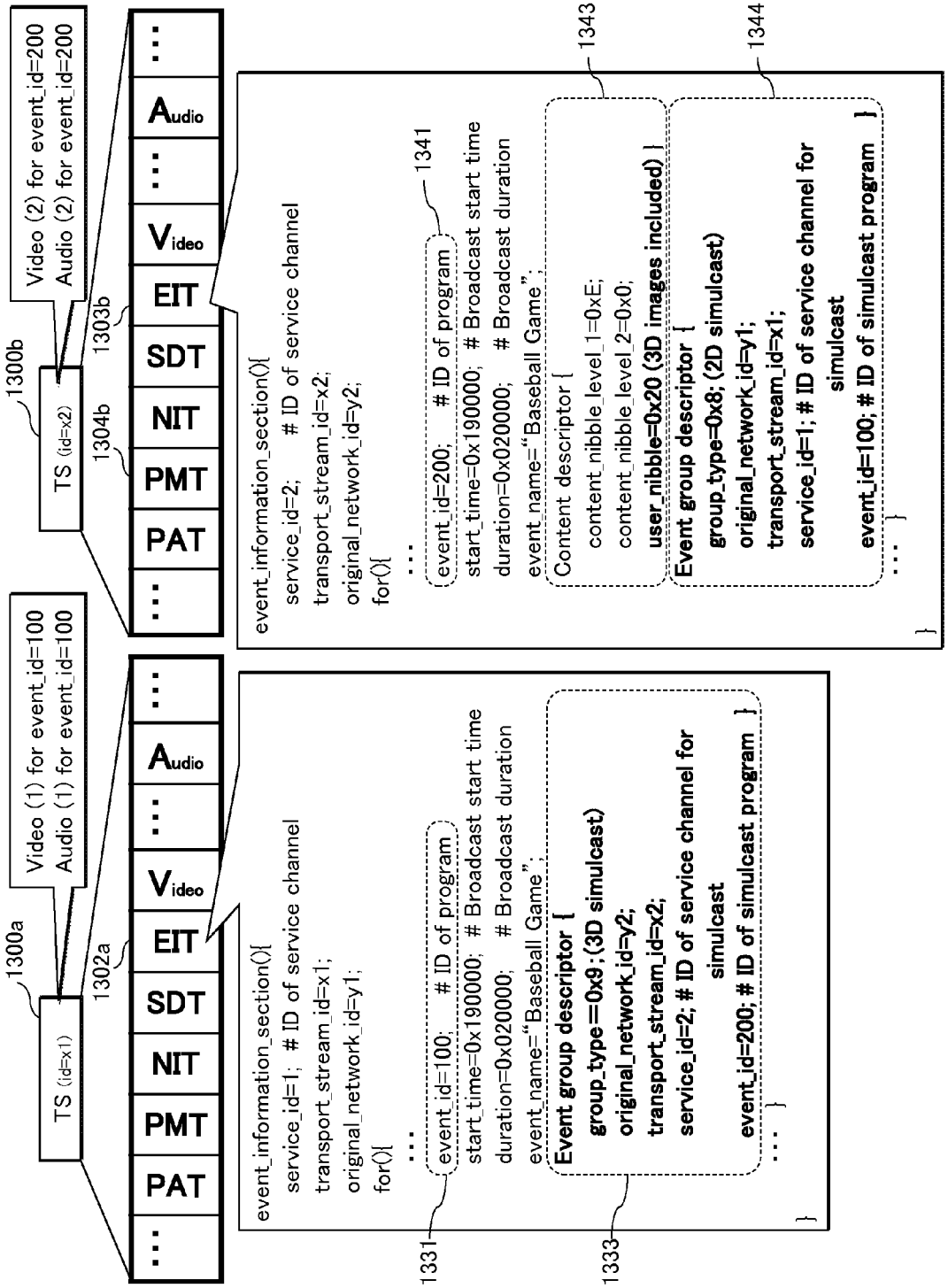
FIG. 12 shows an example of descriptions of EITs 1302a and 1303b in the case where two simulcast programs are carried on separate TSs (TSs 1300a and 1300b).

FIG. 11 and FIG. 12 each show an example where two simulcast programs are carried in separate TSs 1300a and 1300b.

The TS 1300a includes an SDT 1301a and an EIT 1302a as shown in FIG. 11 and FIG. 12.

The TS 1300a is a transport stream of a program on a service channel of Service "1" (service_id=1), and is distributed from a TV station having a name "TV Station A" (service_provider_name="TV Station A"), and a channel name having "Service 1" (service_name="Service 1"), as identified by a descriptor 1320 defining information relating to a service channel in the SDT 1301a.

Also, the TS 1300b is a transport stream of a program on a service channel of Service "2" (service_id=2), and is distributed from a TV station having a name "TV Station A" (service_provider_name="TV Station A"), and a channel name having "Service 2" (service_name="Service 2"), as identified by a descriptor 1325 defining information relating to a service channel in the SDT 1301b.

The TS 1300a and the TS 1300b each have different stream ID (transport_stream_id) and network ID (original_network_id) because the respective TSs differ in generation and the network via which the TS is transported. Specifically, as shown in FIG. 11, a stream ID 1310 and a network ID 1311 of the TS 1300a are identified by transport_stream_id=x1 and original_network_id=y1, respectively, and a stream ID 1315 and a network ID 1316 of the TS 1300b are identified by transport_stream_id=x2 and original_network_id=y2, respectively. That is, the location of each TS is uniquely specified with the two data fields of transport_stream_id and original_network_id.

FIG. 12 shows a description example of the EIT 1302a and the EIT 1302b that are included in the TS 1300a and the TS 1300b, respectively.

In an event ID 1331 of the EIT 1302a, event_id=100 is defined, and this indicates that the TS 1300a, which includes the EIT 1302a, includes video and audio streams of a program identified by event_id=100.

Also, in an event ID 1341 of the EIT 1302b, event_id=200 is defined, and this indicates that the TS 1300b, which includes the EIT 1302b, includes video and audio streams of a program identified by event_id=200. Furthermore, a content descriptor 1343 of the EIT 1302b indicates that the program identified by event_id=200 is a 3D program.

The TS 1300a and the TS 1300b are transport streams for simulcast, and accordingly associate with each other by the event group descriptors 1333 and 1344. The present modification differs from the above embodiment in that transport_stream_id and original_network_id relating to a service channel of another program that is simulcast are described in the event group descriptor. For example, the event group descriptor 1333 of the EIT 1302a describes a stream ID (transport_stream_id=x2) and a network ID (original_network_id=y2) of the TS 1300b identified by event_id=200. Other descriptions of the event group descriptor 1333 are the same as those as in the event group descriptor 333. On the other hand, the event group descriptor 1344 of the EIT 1302b describes a stream ID (transport_stream_id=x1) and a network ID (original_network_id=y1) of the TS 1300a identified by event_id=100. Other descriptions of the event group descriptor 1344 are the same as those as in the event group descriptor 344.

The stream ID and the network ID are added to the event group descriptor for the following reason.

In the present modification, service channels are included in separate TSs, the event descriptor to be added needs to include transport_stream_id and original_network_id to identify each TS as reference information, in addition to the ID of the service channel (service_id) and the program ID (event_id). This is the reason for the above. As a result of addition of these pieces of information, each program in a simulcast pair is enabled to specify the other program in the pair.

The PMT 1304b included in the TS 1300b describes the playback mode of 3D images included in the TS 1300b, in the same manner as in the PMT 304 shown in the above embodiment.

As explained above, with addition of information associating simulcast programs to the EIT, which is program information, switching of playback between simulcast programs is realized even in the case where the simulcast programs are carried on two separate TSs.

Reference information specifying the other program of a simulcast pair differs depending on whether the simulcast programs are included in one TS or in two separate TSs. Therefore, group_type defined by each event group descriptor may be set to a different value.

2.6 Modification 2

In the above embodiment, in the case where a 2D program and a 3D program are simulcast, the 2D program and the 3D program are associated with each other by defining new description in respective event group descriptors of the 2D program and the 3D program. However, conventional digital TV receivers, that is, digital TV receivers not supporting 3D playback cannot interpret such new descriptions. This might make it impossible to switch playback between simulcast programs.

In the present modification in view of this problem, descriptions of an EIT are defined such that even conventional digital TV receivers can switch playback between simulcast programs.

Figure 13:
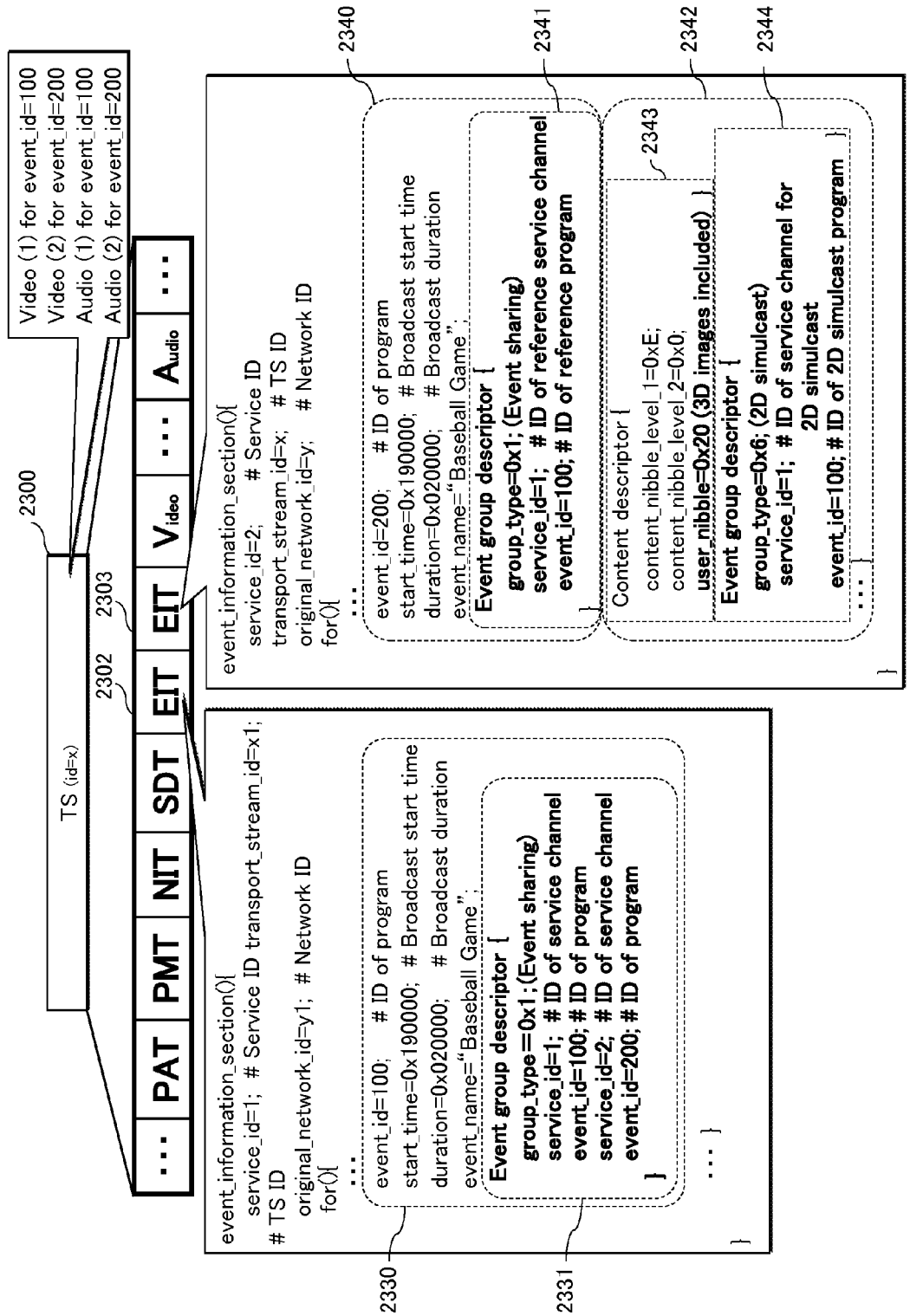
FIG. 13 explains program information in the case where description indicating event sharing is used with respect to EITs 2302 and 2303 included in a TS 2300.

FIG. 13 shows an example where two simulcast programs are carried in a single TS 2300 relating to the present modification. The TS 2300 includes EITs 2302 and 2303 as shown in FIG. 13.

The EIT 2302 describes program information of a 2D program identified by a service channel of Service "1" and an event identifier having "100" (event_id=100).

A descriptor 2330 of the EIT 2302 describes an event identifier (event_id), a start time (start_time), a broadcasting duration (duration), a program title (event_name), and an event group descriptor 2331. The event identifier, the start time, the broadcasting duration, and the program title are the same as those in the EIT 302 shown in the above embodiment.

The event group descriptor 2331 of the EIT 2302 describes information indicating event sharing as is conventionally done. Specifically, group_type=0x1 of the event group descriptor 2331 indicates that the event group descriptor 2331 relates to event sharing. Also, since the EIT 2302 is a reference destination, the event group descriptor 2331 describes reference destination information (service_id=1 and event_id=100) and reference origination information (service_id=2 and event_id=200). These descriptions have been conventionally defined, and therefore are interpretable by conventional digital TV receivers.

The EIT 2303 describes program information of a 3D program identified by service channel of Service "2" and an event identifier having "200" (event_id=200).

A descriptor 2340 of the EIT 2303 describes an event identifier (event_id), a start time (start_time), a broadcasting duration (duration), a program title (event_name), an event group descriptor 2341, and a descriptor 2342. The event identifier, the start time, the broadcasting duration, and the program title are the same as those in the EIT 303 shown in the above embodiment.

The event group descriptor 2341 of the EIT 2303 describes event sharing as is conventionally done. Specifically, group_type=0x1 of the event group descriptor 2341 indicates that the event group descriptor 2341 relates to event sharing. Also, since the EIT 2303 is a reference origination, the event group descriptor 2341 describes only reference destination information (service_id=1 and event_id=100). These descriptions have been conventionally defined, and therefore are interpretable by conventional digital TV receivers.

Furthermore, the descriptor 2342 includes a content descriptor 2343 and an event group descriptor 2344. The content descriptor 2343 and the event group descriptor 2344 have the same descriptions as the content descriptor 343 and the event group descriptor 344, which are shown in the above embodiment, respectively. In other words, these descriptions include newly added descriptions, and therefore are not interpretable by conventional digital TV receivers.

However, by locating the descriptor 2342, which is not interpretable by conventional digital TV receivers, after the descriptor 2340, which is interpretable by conventional digital TV receivers, conventional digital TV receivers can interpret that event sharing is established between a program identified by service_id=2 and a program identified by service_id=1 based on the descriptor 2340.

Figure 14:
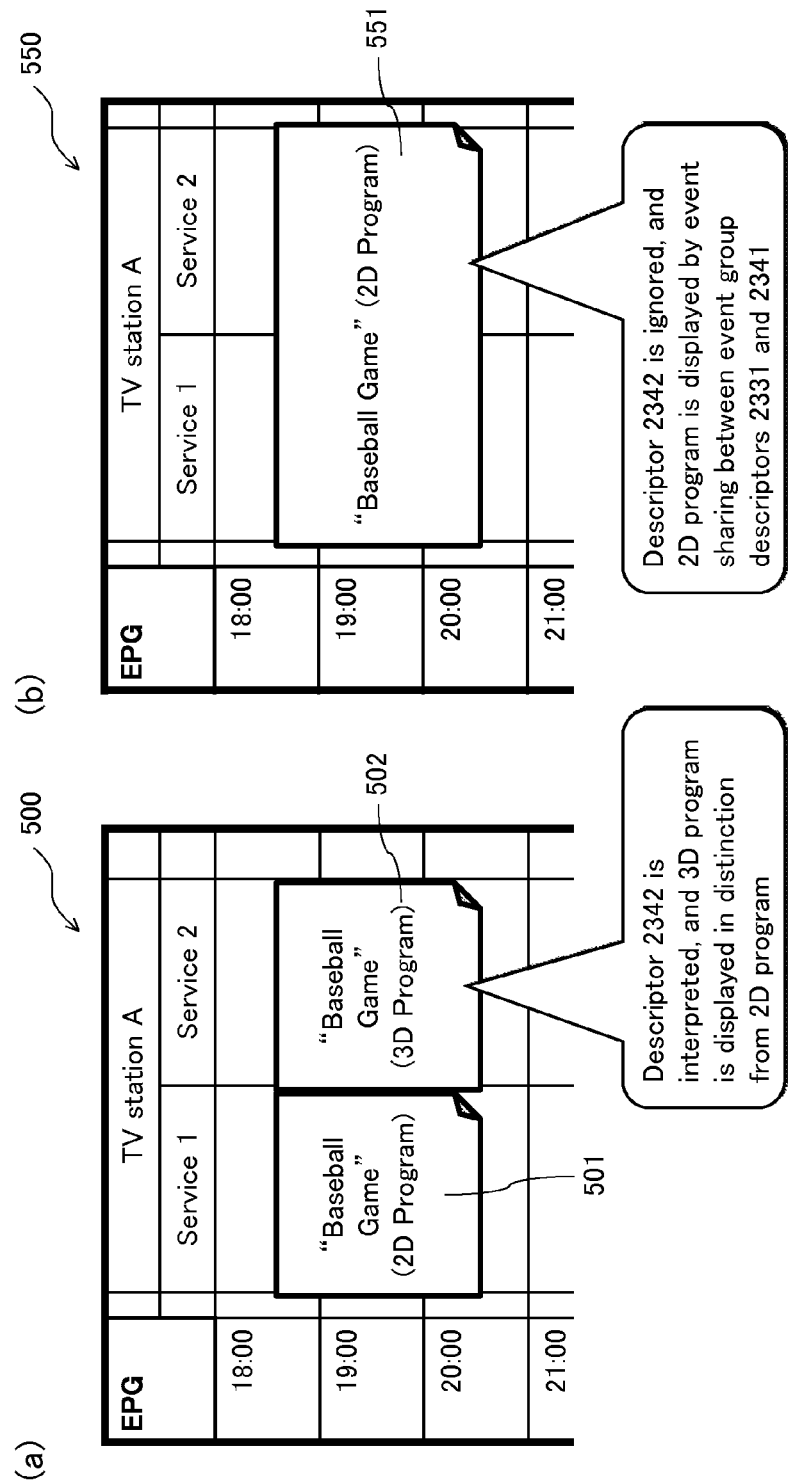
FIG. 14 shows, in section (a), a display example of an EPG 500 in the case where a descriptor 2342 is interpreted, and shows, in section (b), a display example of an EPG 550 in the case where descriptors 2331 and 2341 are interpreted.

FIG. 14 shows display examples of respective EPGs in a digital TV receiver capable of interpreting the descriptor 2342 and a conventional digital TV receiver incapable of interpreting the descriptor 2342.

FIG. 14 shows, in section (a), an example of an EPG 500 displayed by a digital TV receiver capable of interpreting the descriptor 2342. In this case, the digital TV receiver interprets the descriptor 2342, and accordingly displays, on the EPG 500, a "Baseball Game" program 501 as a 2D program and a "Baseball Game" program 502 as a 3D program so as to be distinguishable from each other in the same manner as in the above embodiment.

FIG. 14 shows, in section (b), an example of an EPG 550 displayed by a conventional digital TV receiver. In this case, the conventional digital TV receiver cannot interpret the descriptor 2342, and accordingly the description of the descriptor 2342 is ignored. Then, only one program, namely, a "Baseball Game" program 551 is displayed on the EPG 550 based on the description of the event group descriptor 2341 indicating event sharing in the interpreted descriptor 2340.

2.7 Modification 3

FIG. 15 shows a display example of an EPG by the digital TV receiver which is different from that shown in FIG. 8.

As explained in the above embodiment, in the case where a 2D program and a 3D program are simulcast, program information corresponding to the 2D program and program information corresponding to the 3D program on each service channel are each included in a single TS 300.

In the case where a 3D compatible digital TV receiver receives such a TS 300, an EPG may be displayed in a format such as shown in FIG. 8.

On the other hand, in the case where a digital TV receiver not supporting 3D playback receives such a TS 300, this digital TV receiver is not cable of playing back the 3D broadcasting. Whether a program includes 3D images can be identified by detecting a content descriptor "3D images included" from the EIT, which is program information corresponding to the program. On detecting the descriptor "3D images included", the digital TV receiver displays an EPG in a manner to indicate to the user that 3D viewing is not supported.

In view of this, as shown in the left block of FIG. 15, a TV receiver not supporting the 3D playback mode of a program that is currently broadcast displays an EPG 600 with use of a different color to display a "Baseball Game" program 601 as a 2D program and a "Baseball Game" program 602 as a 3D program, thereby indicating that the 3D program cannot be viewed on the TV receiver. That is, by displaying a corresponding portion of an EPG with a different color, the user is notified that the program is a 3D program and cannot be viewed on the current TV receiver.

The TV receiver not supporting the 3D playback mode of the currently broadcast program may disable selection of the 3D program on the EPG. Alternatively, since the purpose of the color display in the above manner is to notify the user that the program is a 3D broadcast program, it does not matter even if a user selection of the 3D program on the EPG is enabled.

In the case where a user selects a 3D program on a digital TV receiver not supporting the 3D playback mode, the digital TV receiver operates as explained in the above embodiment, and accordingly description thereof is omitted here.

Figure 16:
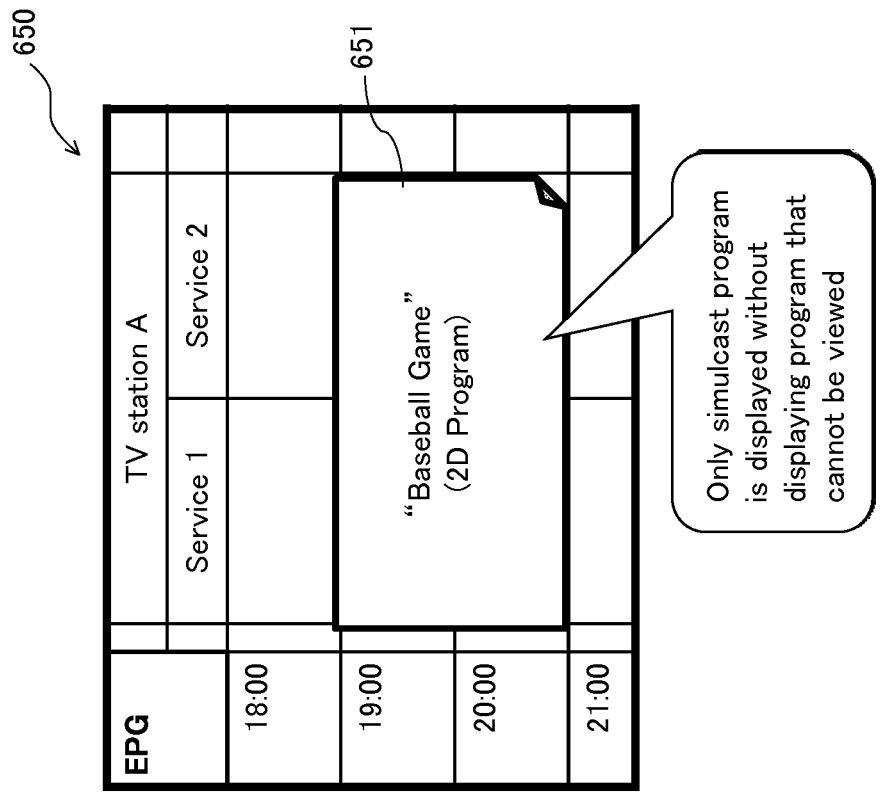
FIG. 16 shows an example of an EPG 650 displayed by the reception and playback device 200.

In another example of display method as shown in FIG. 16, in the case where a TV receiver not supporting the 3D playback mode cannot play back 3D programs, any 3D programs may not ever be displayed on an EPG.

The program information of a "Baseball Game" program broadcast on Service 2 includes information indicating "3D images included" and information indicating the 3D playback mode. With reference to these pieces of information, the TV receiver can determine that the "Baseball Game" program broadcast on Service 2 is a 3D program of the SBS mode. In addition, the program information indicates that there is a simulcast program and includes link information indicating the channel ID and the program ID to associate with the "Baseball Game" program broadcast on Service 1.

Accordingly, digital TV receivers not supporting the 3D playback mode may display the EPG 650 on which a 2D "Baseball Game" program 651 broadcast on Service 1 is displayed in a cell merged with a cell that would otherwise be used for displaying the 3D program that cannot be viewed on the TV receivers (see FIG. 16).

With the display method described above, the user is presented with selectable items only, so that risk of unnecessary confusion is eliminated.

Yet, not presenting information relating to 3D programs to the user may equally mean that the user is missing an opportunity for viewing 3D programs. In this standpoint, the EPG display of the former method (display method in which a 2D program and a 3D program are displayed with different colors) informs the user about the fact that the 3D program is being broadcast, which is effective to increase user's interest on 3D viewing.

2.8 Modification 4

The following explains the method for associating pieces of program information regarding 3D broadcasting in the event relay mode.

The event relay broadcasting (hereinafter, referred to as relay broadcasting) is a broadcast mode in which a program is switched to another program across a service channel (service) at some midpoint in the program for continuous viewing.

Figure 17:
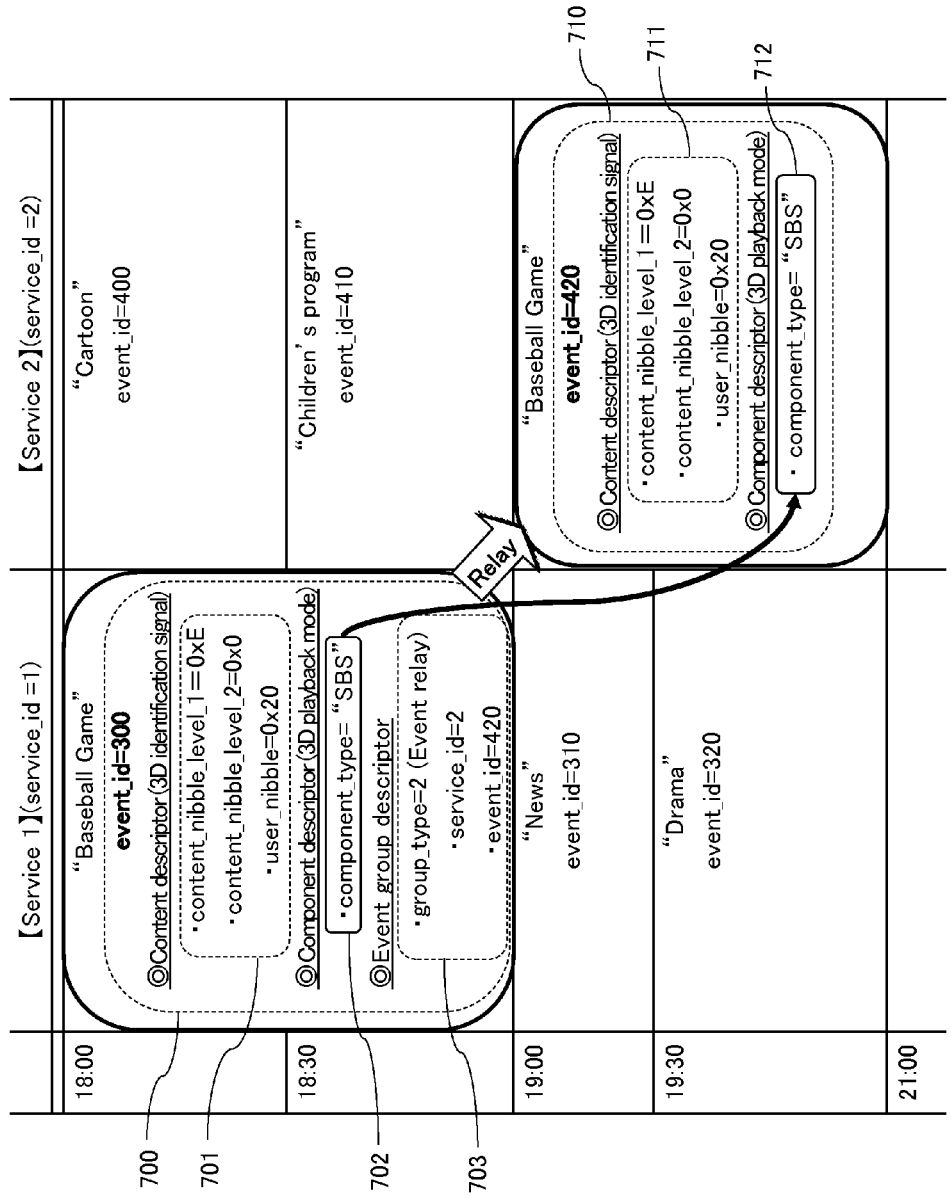
FIG. 17 shows respective descriptions of first program information 700 and second program information 710 in relay broadcasting.

FIG. 17 shows program information in an example of relay broadcasting of a "Baseball Game" program between Service 1 and Service 2 which are on the same channel. The "Baseball Game" program shown in FIG. 17 is broadcast for 3D viewing according to the SBS mode.

For purposes of description, first program information 700 refers to a "Baseball Game" program broadcast on Service 1 from 18:00 to 19:00, whereas second program information 710 refers to a "Baseball Game" program broadcast on Service 2 from 19:00 to 21:00.

The first program information 700 and the second program information 710 each have a program ID (event_id) identifying a corresponding program. Specifically, the first program information 700 has a value "300" as an event ID, whereas the second program information 710 has a value "420" as an event ID.

In addition, the respective programs corresponding to the first program information 700 and the second program information 710 are both in the "3D broadcasting" mode as a broadcast mode. The first program information 700 and the second program information 710 have content descriptors 701 and 711 respectively indicating a 3D identification signal to identify that the program information is in the "3D broadcasting" mode. For example, the content descriptor 701 has values "content_nibble_level_1=0xE", "content_nibble_level_2=0x0", and "user_nibble=0x20". Upon detecting the above values, a TV receiver determines that the programs include "3D images" and thus the programs are in the "3D broadcasting" mode.

In addition, in the case where a program is broadcast for 3D viewing, the "3D playback mode" employed in 3D broadcasting may be described in the program information. Specifically, a component descriptor usable to describe the stream attribute is used to describe the "3D playback mode" used in 3D broadcasting. For example, by setting to a value indicating "SBS" as "3D playback mode", "component_type" in the component descriptor indicates that the corresponding program is a 3D program of the SBS mode. Also, by setting to a value indicating the "MVC" as "3D playback mode", "component_type" in the component descriptor indicates that the corresponding program is a 3D program of the MVC mode.

The program corresponding to the first program information 700 and the program corresponding to the second program information 710 are separate programs each identified by a different program ID (event_id). The first program information 700 and the second program information 710 include the content descriptors 701 and 711 indicating "3D broadcasting", respectively, and also include the component descriptors 702 and 712 indicating the "3D playback mode", respectively.

As information associating the program corresponding to the first program information 700 with the program corresponding to the second program information 710 for which relay broadcasting is to be effected, reference information for event relay may be described in the first program information 700 using an event group descriptor in a manner similar to that used in the conventional 2D broadcasting according to the ARIB standard (ARIB STD-B10). Specifically, setting group_type=2 (event relay) in the event group descriptor 703 provides link information to the following program information in relay broadcasting.

FIG. 17 shows relay broadcasting from the first program information 700 to the second program information 710. The first program information 700 includes information specifying the channel ID of Service 2 to which the second program information 710 belongs (service_id=2), and also includes the program ID of the second program information 710 (event_id=420). By the event group descriptor having a group type set to a value indicating event relay, the two programs are determined as a series of programs for relay broadcasting from the first program information 700 to the second program information 710.

In relay broadcasting of conventional 2D programs, it is not specifically assumed that the broadcast mode differs among programs for relay broadcasting. In 3D broadcasting, however, it is possible that the same program is simulcast in 2D and also in 3D or that two 3D broadcast programs differ in the 3D mode (such as the MVC mode and the SBS mode). That is, event relay in 3D broadcasting involves the risk that continuous viewing between programs might fail if the broadcast modes of the respective programs differ. Therefore, in event relay of 3D broadcasting, it is desirable that programs in event relay has the same broadcast mode.

As shown in FIG. 17, the event group descriptor 703 included in the first program information 700 indicates that the program corresponding to the first program information 700 is relayed to the program corresponding to the second program information 710. In addition, if the first program information 700 includes a content descriptor indicating a 3D identification signal, the second program information 710 needs to be a 3D broadcast program and include a content descriptor indicating a 3D identification signal. That is, a program relayed from a 3D program should also be a 3D program.

In addition, if the first program information 700 and the second program information 710 each identify a 3D program, the 3D mode of the programs should be described as the same. That is, when the component descriptor 702 of the first program information 700 includes "component_type" set to a value indicating "SBS", "component_type" in the component descriptor 712 of the second program information 710 should also be set to the value indicating "SBS".

Note that if the first program information 700 does not include a content descriptor indicating a 3D identification signal, the second program information 710 should not include a content descriptor indicating a 3D identification signal, either. Yet, when the second program information 710 is broadcast in a 3D playback mode compatible with 2D playback such as MPEG4-MVC, the second program information 710 may include a content descriptor indicating a 3D identification signal. However, the second program information 710 needs to be converted for 2D playback.

With the above arrangement, continues viewing of programs is smoothly realized in relay broadcasting of 3D programs.

When recording two programs in event relay as explained above, a recorder may record the two programs as one linked program. On condition that multiple streams on two different service channels are in the same broadcast mode, a recorder is enabled to link the streams in a simple manner. In addition, the recorder with a simple implementation is capable of ensuring smooth viewing of programs to the user.

This concludes the explanation of associating pieces of program information with each other in even relay of 3D broadcasting.

3. Other Modifications

Also, the present invention for example includes the following modifications without limiting to the above embodiment and so on.

(1) In the above embodiment, an example of the reception and playback device is a digital TV receiver. However, the present invention is not limited to this. Alternatively, the reception and playback device may be any device that receives and plays back a transport stream, such as a DVD recorder, a BD (Blu ray Disc) recorder, and an STB (Set Top Box).

(2) In the above embodiment, the 3D playback mode is described in a PMT. However, the present invention is not limited to this.

Alternatively, the 3D playback mode may be described by a component descriptor in an EIT.

Figure 10:
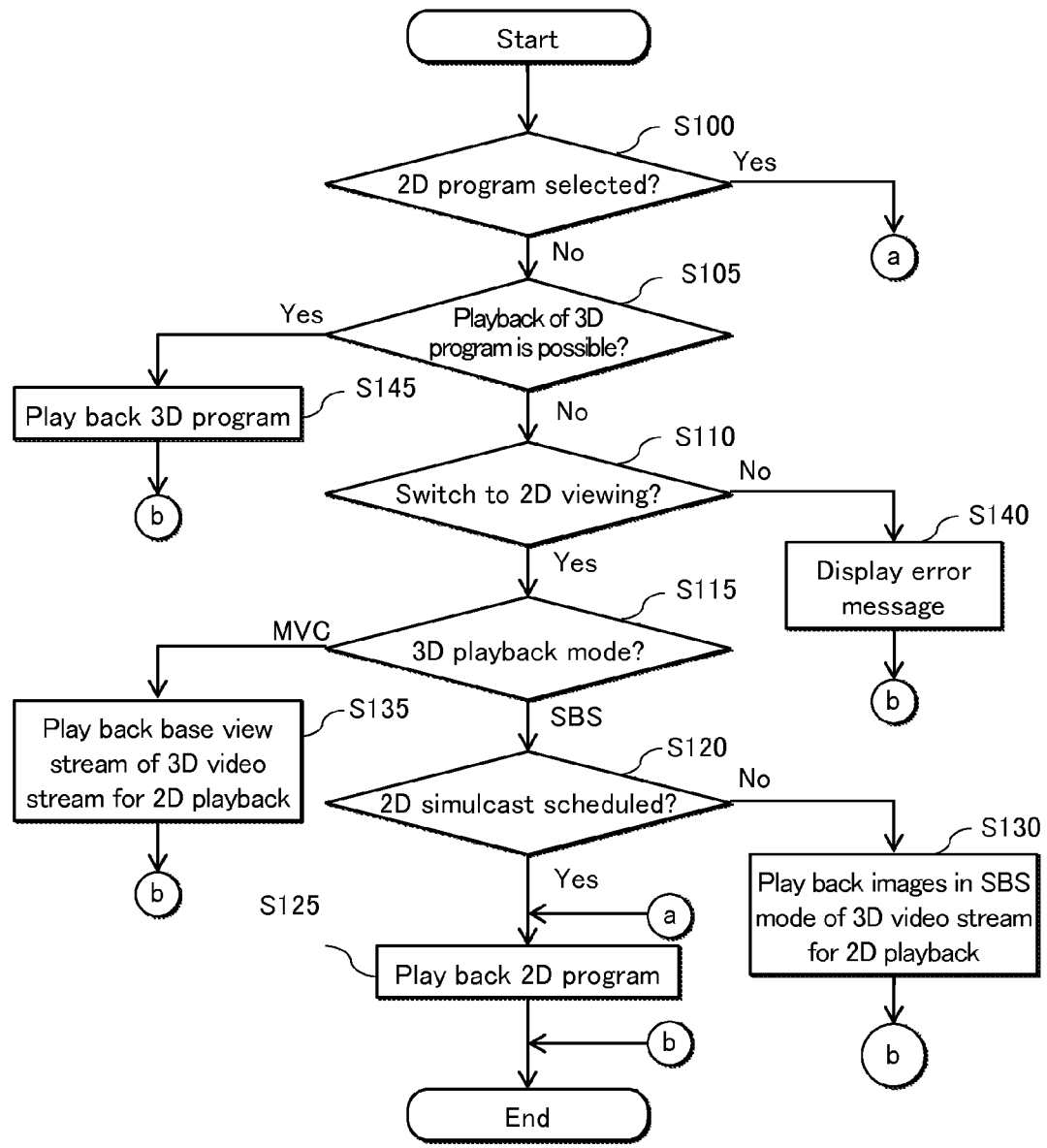
FIG. 10 is a flow chart showing operations of the reception and playback device 200.

(3) In the above embodiment, the operations of the reception and playback device shown in FIG. 10 are just an example, and the present invention is not limited to this.

Alternatively, each or some of the steps shown in FIG. 10 may be separately implemented or executed. For example, Step S115 causing a branch depending on the type of 3D playback mode may be omitted and Step S120 causing a branch may be performed, namely, switching to the 2D program may be caused irrespective of the 3D playback mode employed and exclusively on the determination whether or not a 2D simulcast program is available.

(4) In the above embodiment, the operations shown in FIG. 10 are applied upon playback for viewing. However, the present invention is not limited to this.

Alternatively, the same operations may be applicable to a recorder having the function of pre-programmed recording. That is, when a user sets a recorder not supporting 3D playback to record a 3D program in advance, the recorder operates to select a corresponding 2D program in the same manner as explained above and record the thus selected 2D program.

(5) Link information associates two pieces of program information with each other that are equivalent in content but differs in whether it is 2D or 3D. The two pieces of program information to be associated with each other are not limited to those broadcast at the same time. The switching between 2D and 3D may be made using two pieces of program information that are broadcast in different time slots.

This function is effective in a recorder not supporting 3D viewing which has the function of pre-programmed recording. If a user sets the recorder to record a 3D program in advance, the recorder automatically records a corresponding 2D program that is recordable by that recorder.

(6) In the above embodiment, association of a pair of simulcast programs is performed with use of the event group descriptors. However, the present invention is not limited to this.

Alternatively, a descriptor having a new data structure may be used to associate a pair of simulcast programs.

In addition, the reference between the simulcast programs may be bidirectional or alternatively unidirectional by designating one of the programs as a main program and the other as a sub-program. Suppose, for example, a 2D program is designated as the main broadcasting, whereas a 3D program simulcast with the 2D program as sub-broadcasting. In this example, it is sufficient that the program information of the 3D program, which is sub-broadcasting is provided with reference information using an event group descriptor specifying the 2D program, which is the main broadcasting.

Also, in the above embodiment, association of a pair of simulcast 2D and 3D programs is performed bidirectionally. Alternatively, the association may at least only need to be performed unidirectionally from the 3D program to the 2D program.

(7) In the above embodiment, association of a pair of 2D and 3D programs is performed when simulcast is distributed as a broadcast wave. However, the present invention is not limited to this.

Alternatively, association of a pair of 2D and 3D programs may be performed when simulcast is distributed via PCs (Personal Computers), IP (Internet Protocol) broadcast, and VOD (Video ON Demand).

As an association method in this case, a URL (Uniform Resource Locator) is used which indicates a storage location of a linked program.

The URL may be described in a stream for distributing the program together with the program or in a file included in a program guide.

Alternatively, with use of link information such as URLs and event group descriptors, association of programs may be performed among different distribution formats such as broadcasting, PCs, IP broadcast, and VOD.

In this case, with use of link information, an optimal broadcasting (stream) may be selected in accordance with a viewing environment (a TV receiver, a PC, a mobile terminal, or the like).

(8) In the above embodiment, the explanation is provided that in the case where a 3D program is selected as a program to be viewed in a digital TV receiver not supporting 3D viewing, switching to a 2D program is performed with use of link information.

However, use of link information is not limited to the above case.

Suppose, for example, that an instruction is issued to switch from 2D viewing to 3D viewing via buttons of a remote control or the like while a 2D simulcast program is viewed in a digital TV receiver supporting 3D viewing. In this case, switching may be performed to a 3D simulcast program with use of link information described in an EIT of the 2D program which is being viewed.

Also, suppose that in the case where a simulcast pair of 2D and 3D programs is displayed on an EPG in a digital TV receiver supporting 3D viewing. In this case, when the 2D program is selected, switching may be preferentially performed to the 3D program to with use of link information.

(9) In the above embodiment, the EITs 302 and 303, particularly, the event group descriptors 333 and 344, may be generated by a method according to which "group_type", "service_id", and "event_id" are stored as parameter variables in advance in a device for generating an EIT (the transmission device 100 or an external device), and information relating to these parameter variables are received from a user. This generation method is just an example, and other method may be used.

Note that description other than the event group descriptors 333 and 344 is the same as conventional description, and accordingly explanation thereof is omitted.

(10) In the above embodiment, simulcast of the 2D broadcast mode and the 3D broadcast mode is assumed. Alternatively, the present invention is applicable to simulcast of any combination of broadcast mode.

The essence of the present invention is to provide viewers who continue viewing according to a conventional broadcast mode after introduction of a new broadcast mode with a broadcasting service keeping backward compatibility between the conventional broadcast mode and the new broadcast mode and having a maintained image quality.

For example, there is an expectation for provision of a video service of 4K2K resolution and 8K4K resolution, which are higher than the resolution of full HD (1920×1080) in the conventional broadcasting system in terms of resolution, image quality, and definition.

In this case, there is a possibility that simulcast of the full HD mode and the 4K2K mode or simulcast of the full HD mode and the 8K4K mode is operated in the same manner as simulcast of the 2D mode and the 3D mode. The operational advantage of the present invention is the same even in the case where the 3D broadcast mode is replaced with the 4K2K mode, and the 4K2K mode is effective as the means for securing the backward compatibility.

(11) In the above embodiment, the SBS mode is used as an example of the playback mode of 3D images of the resolution of half HD. Alternatively, the top-and-bottom mode may be used according to which a left-view image and a right-view image in a pair are separately compressed to ½ in the vertical direction and disposed next to each other.

Also, in the above embodiment, the MVC mode is used as a mode compatible with 2D playback. Alternatively, the dual stream mode may be used for example according to which a dual stream is generated according to the MPEG2 format. The dual stream is composed of separate left-eye stream and right-eye stream.

(12) The above devices are each specifically a computer system that is composed of a microprocessor, a ROM, a RAM, a hard disk unit, a display unit, a keyboard, a mouse, and so on. The RAM or the hard disk unit stores therein a computer program. The devices each realize respective functions by the microprocessor operating in accordance with the computer program. Here, the computer program is composed of combinations of instruction codes each indicating an instruction to a computer in order to achieve predetermined functions.

(13) Part or all of the structural elements of each of the above devices may be embodied as a single integrated circuit.

(14) Part or all of the structural elements of each of the above devices may be embodied as an IC card detachable from the device or a single module. The IC card or the module is a computer system composed of a microprocessor, a ROM, a RAM, and so on. The IC card or the module may include a super multifunctional LSI. Functions of the IC card or the module are achieved by the microprocessor operating in accordance with a computer program.

(4) Also, it may be possible to employ the structure in which a program that includes the procedure of the methods described in the above embodiment and modifications are stored in a memory, and the program is read by a CPU (Central Processing Unit) or the like from the memory to execute the read program, thereby realizing the above methods.

Alternatively, the program that includes the procedure of the above methods may be stored in a storage medium and be distributed. The storage medium for storing the above program is, for example, an IC card, a hard disk, an optical disc, a flexible disc, a ROM, and a flash memory.

(16) The present invention may be any combination of the above embodiment and modifications.

4. Summary

In recent years, 3D broadcasting is becoming more and more common in digital TV broadcasting. However, when a 3D program is selected as a program to be viewed via a user's operation in a digital TV receiver not supporting 3D viewing, this digital TV receiver has to perform 2D playback of a video that is broadcast as a 3D program.

In view of this, it is required that the same program is available for 2D playback as well as 3D playback. The program should desirably be played back as full HD images for 2D display. Accordingly, a broadcasting station (transmission device) simulcasts two programs with respect to the same program, namely, a program for 2D playback and a program for 3D playback, as explained in the above embodiment.

Also, program organization information of a 3D program such as PSI/SI includes a descriptor indicating a 3D identification signal for identifying whether the program includes 3D images. By detecting a 3D identification signal, a digital TV receiver displays an EPG on a screen including explicit indications of 3D programs.

In the case where a 2D program and a 3D program with respect to the same program are simulcast at the same time, it is necessary to visually indicate on an EPG that simulcast is performed by displaying the 2D program and the 3D program so as to be distinguished from each other such as shown in FIG. 8. This is because TV receivers supporting 3D viewing and not supporting 3D viewing are both expected to remain in users' viewing environments, and therefore there remains a continuing demand for viewing one broadcast program in various viewing forms.

There is no problem that both a digital TV receiver not supporting 3D playback (hereinafter, referred to as non-3D TV receiver) and a digital TV receiver supporting 3D playback (hereinafter, referred to as 3D TV receiver) each display both a 2D program and a 3D program so as to be distinguished from each other.

On the 3D TV receiver, it is advantageous to explicitly indicate the 3D program on an EPG to improve the user convenience of selecting a 3D program for viewing.

However, the non-3D TV receiver is incapable of playing back a 3D program even if a user knows that there is the 3D program. In view of this, it is one option to disable user selection of any 3D program. Alternatively, however, user selection of 3D programs on the EPG may be enabled in order to avoid user inconvenience. Yet, since viewing of a 3D program is not possible even if selection on the EPG is enabled, the non-3D TV receiver has to perform 2D playback of the selected 3D program.

In the case where the selected 3D program is broadcast as a stream compatible with a full HD 2D program like an MPEG4-MVC transport stream, the stream for the 3D program is directly usable for 2D playback with the same image quality of 2D images.

However, in the case of 3D images of the SBS mode, 2D playback results in display of images with the resolution of half HD which is half the resolution of the inherent full HD. This causes the user to view images at a low image quality compared with 2D viewing of images.

In view of this, as explained in the above embodiment, as long as a 2D program that is equivalent in content to a 3D program is simulcast on the service channels, a non-3D TV receiver switches to playback of the 2D simulcast program. As a result, the user can view the 2D program with the full HD resolution and a maintained image quality.

In the above embodiment, a digital TV receiver incorporates a mechanism by which channel selection is automatically switched to a 2D simulcast program in a manner not noticeable to the user.

Specifically, in an EIT included in a transport stream, link information is added to respective pieces of program information of a simulcast pair of 2D and 3D programs. The link information indicates the program is one program of a simulcast pair.

Although link information is added, the 2D program and 3D program may be separately displayed on an EPG since the respective programs are broadcast on different service channels and have separate pieces of program information. For this reason, in simulcast of a 2D program and a 3D program, the EPG displays 2D broadcasting and 3D broadcasting of the same program on two channels.

In such a case, a user's operation of selecting either of the 2D program or the 3D program on the EPG commonly leads to playback of the 2D program without causing any problem. This is because when the 3D program simulcast with the 2D program is selected from the EPG by the user in a non-3D TV receiver, link information is used to automatically establish a link to the 2D simulcast program thereby to play back the 2D program.

As described in the above embodiment, when a 2D program and a 3D program are simulcast, the transmission device adds link information to respective pieces of program information of the 2D program and the 3D program which are simulcast. Then, when a user selects the 3D program, the reception and playback device uses link information to play back the 2D simulcast program without notifying a user of switching to the 2D simulcast program.

6. Supplement (1) One aspect of the present invention provides a transmission device comprising: a storage unit that stores therein 3D access information and 2D access information respectively corresponding to a 3D stream and a 2D stream that are simulcast; and a transmission unit configured to transmit the 3D access information and the 2D access information.

With this structure, the transmission device outputs both the 3D access information and the 2D access information relating to simulcast. Accordingly, a device that plays back 2D streams uses the 2D access information, and a device that plays back 3D streams uses the 3D access information, thereby enabling playback in accordance with a user's viewing environment. The 2D access information includes both descriptions in an EIT of a 2D program and link information described in an EIT of a 3D program in the above embodiment. Also, the storage unit corresponds to the program organization information storage unit 109 in the above embodiment, the transmission unit corresponds to a combination of the multiplexing unit 107 and the transmission unit 108 in the above embodiment.

(2) Here, the 3D stream may be an MPEG2-TS compliant stream, the storage unit may store therein an EIT (Event Information Table) corresponding to the 3D stream and including the 3D access information and the 2D access information, and the transmission unit may transmit a data stream into which the 3D stream and the EIT are at least multiplexed.

With this structure, the transmission device includes both the 3D access information and the 2D access information in the EIT corresponding to the 3D stream. Accordingly, when a 3D stream is selected from an EPG which is displayed based on the EIT in the device that plays back 2D streams, the transmission device causes the device that plays back 2D streams to access the 2D stream with use of the 2D access information, without notifying a user of switching from the 3D stream to the 2D stream.

(3) Here, the data stream may include 3D playback mode information indicating whether a playback mode for frames of a 3D stream included in the data stream is a playback mode for frames each composed of a single-viewpoint image or a playback mode for frames each composed of a multi-viewpoint image.

With this structure, the transmission device transmits the data stream including the 3D playback mode information. Accordingly, when a 3D stream is selected in the device that plays back 2D streams, the transmission device causes the playback device that plays back 2D streams to select one of a 2D stream and a 3D stream in a pair in accordance with the 3D playback mode indicated by the 3D playback mode information. This is because of the following reasons. If the 3D playback mode information indicates the playback mode for frames each composed of a single-viewpoint image, the frames each composed of a single-viewpoint image are equivalent in resolution to those of a 2D stream, and accordingly playback of frames each composed of a single-viewpoint image of a 3D stream is equivalent in image quality to playback of those of a 2D stream. Also, if the 3D playback mode information indicates the playback mode for frames each composed of a multi-viewpoint image, the frames of a 3D stream are lower in resolution to those of a 2D stream, and accordingly playback of the 2D stream provides a high image quality.

(4) Here, the 3D access information may be located after the 2D access information in the EIT.

With this structure, the transmission device transmits the EIT of the 3D stream in which the 3D access information is located after the 2D access information. This enables a receiver that is incapable of interpreting the 3D access information to surely interpret the 2D access information in advance of interpreting the 3D access information.

(5) Also, one aspect of the present invention provides a reception and playback device that receives and plays back a distributed stream for 2D display, the reception and playback device comprising: a stream reception unit configured to receive a stream to be received and played back that is selected via a user's operation; an information reception unit configured to receive simulcast judgment information for judging whether a 2D stream and a 3D stream are simulcast; a judgment unit configured to, when the stream reception unit receives the 3D stream selected as a stream to be received and played back, judge whether a 2D stream corresponding to the selected 3D stream is simulcast with the selected 3D stream, with use of the simulcast judgment information; and a playback unit configured to, when the judgment unit judges affirmatively, play back the simulcast 2D stream, and when the judgment unit judges negatively, play back the 3D stream for 2D display.

With this structure, when a 2D stream which is simulcast with a 3D stream even if the 3D stream is selected, the reception and playback device plays back the 2D stream. Accordingly, when receiving an instruction to select the 3D stream, the reception and playback device switches a stream to be played back from the 3D stream to the 2D stream in a manner not noticeable to the user. Also, the stream reception unit corresponds to the function of the selected program analysis unit 213 of receiving an instruction from a user in the above embodiment. The information reception unit corresponds to the tuner 201 in the above embodiment. The judgment unit corresponds to the function of the selected program analysis unit 213 of judging whether simulcast is available in the above embodiment. The playback unit corresponds to a combination of the demultiplexing unit 202, the video decoding unit 205, the audio decoding unit 206, the video processing unit 207, and the display unit 208 in the above embodiment.

(6) Here, the simulcast judgment information may be an EIT (Event Information Table) corresponding to the 3D stream included in an MPEG2-TS compliant data stream, when a 2D stream and a 3D stream are simulcast, the EIT may include 2D access information relating to access to the simulcast 2D stream and 3D access information relating to access to the simulcast 3D stream, the judgment unit may judge whether the EIT includes the 2D access information, when the judgment unit judges that the EIT includes the 2D access information, the playback unit may access the 2D stream with use of the 2D access information, and when the judgment unit judges that the EIT does not include the 2D access information, the playback unit may access the 3D stream with use of the 3D access information.

With this structure, when a 3D stream is selected from the EPG which is displayed based on the EIT, the reception and playback device accesses a 2D stream with use of 2D access information, without notifying the user of switching from the 3D stream to the 2D stream.

(7) Here, before judging whether the EIT includes the 2D access information, the judgment unit may judge whether frames of the 3D stream are each composed of a single-viewpoint image or a multi-viewpoint image, and when the judgment unit judges that the frames of the 3D stream are each composed of a single-viewpoint image, the playback unit may play back the 3D stream for 2D display irrespective of whether the 2D stream is simulcast with the 3D stream.

With this structure, the reception and playback device judges the configuration of frames of the 3D stream before judging whether simulcast of a pair of the 2D program and the 3D program is available. Accordingly, when a 3D stream is selected from the EPG, the reception and playback device can play back the 3D stream with a resolution equivalent to a resolution of a 2D stream, without switching from the 3D stream to the 2D stream. This is because if frames of the 3D stream are each composed of a single-viewpoint image, the frames each composed of a single-viewpoint image are equivalent in resolution to those of the 2D stream, and accordingly playback of the frames each composed of a single-viewpoint image of the 3D stream for 2D viewing is equivalent in image quality to playback of those of the 2D stream.

INDUSTRIAL APPLICABILITY

The present invention is applicable to a device that transmits a simulcast pair of a 2D program and a 3D program and a device that receives and plays back the simulcast.

REFERENCE SIGNS LIST

10 program distribution system
100 transmission device
101 3D video encoder
102 2D video encoder
103 audio encoder
104 3D video stream storage unit
105 2D video stream storage unit
106 audio stream storage unit
107 multiplexing unit
108 transmission unit
109 program organization information storage unit
200 digital TV receiver (reception and playback device)
201 tuner
202 demultiplexing unit
203 program information management unit
204 program guide generation unit
205 video decoding unit
206 audio decoding unit
207 video display processing unit
208 display unit
211 PSI/SI analysis unit
212 program information DB
213 selected program analysis unit

The invention claimed is:
1. A transmission device comprising:
a storage unit that stores therein first type event information and second type event information respectively included in a first type stream and a second type stream that are simulcast in a data stream, the second type stream being defined by a standard different from a standard defining the first type stream; and
a transmission unit configured to transmit the first type stream and the second type stream, wherein
the first type event information includes second type access information relating to access to the second type stream,
the second type event information includes first type access information relating to access to the first type stream and attribute information of the second type stream,
in the second type event information, the attribute information of the second type stream is located after the first type access information,
in the data stream, the second type event information is located after the first type event information, the first type access information and the second type access information relate to a same program in terms of content, the first type stream is a stream having a resolution of full HD and the second type stream is a stream having a resolution higher than the resolution of full HD, and the second type event information refers to the first type event information to establish event sharing between a first type event corresponding to the first type stream and a second type event corresponding to the second type stream.

2. The transmission device of claim 1, wherein
the first type stream is a stream of a 2D mode, and
the second type stream is a stream of a 3D mode.

3. The transmission device of claim 1, wherein
the second type stream is an MPEG2-TS compliant stream,
the second type event information is an EIT (Event Information Table), and
the transmission unit transmits the data stream into which the second type stream and the EIT are multiplexed.

4. The transmission device of claim 3, wherein
the data stream includes 3D playback mode information indicating whether a playback mode for frames of a 3D stream included in the data stream is a playback mode for frames each composed of a single-viewpoint image or a playback mode for frames each composed of a multi-viewpoint image.

5. A reception and playback device that receives and plays back a distributed data stream with a resolution of full HD, the reception and playback device comprising:
a stream reception unit configured to receive a data stream to be received and played back that is selected via a user's operation;
an information reception unit configured to receive simulcast judgment information for judging whether a first type stream having the resolution of full HD and a second type stream having a resolution higher than the resolution of full HD are simulcast in the data stream, the second type stream being defined by a standard different from a standard defining the first type stream;
a judgment unit configured to, when the stream reception unit receives the second type stream selected as the data stream to be received and played back, judge whether the first type stream corresponding to the selected second type stream is simulcast with the selected second type stream, with use of the simulcast judgment information; and
a playback unit configured to, when the judgment unit judges affirmatively, play back the simulcast first type stream with the resolution of full HD, and when the judgment unit judges negatively, play back the second type stream with the resolution of full HD, wherein
the information reception unit receives first type event information and second type event information respectively included in the first type stream and the second type stream, and the second type event information being the simulcast judgment information,
the first type event information includes second type access information relating to access to the second type stream,
the second type event information includes first type access information relating to access to the first type stream and attribute information of the second type stream, in the second type event information, the attribute information of the second type stream is located after the first type access information, in the data stream, the second type event information is located after the first type event information, the first type access information and the second type access information relate to a same program in terms of content, when the judgment unit judges affirmatively, the playback unit accesses the first type stream with use of the first type access information included in the second type event information, and when the judgment unit judges negatively, the playback unit accesses the second type stream with use of the second type access information included in the first type event information.

6. The reception and playback device of claim 5, wherein
the simulcast judgment information is an EIT (Event Information Table) corresponding to the second type stream included in an MPEG2-TS compliant data stream,
when the first type stream and the second type stream are simulcast, the EIT includes the first type access information relating to the access to the simulcast first type stream,
the judgment unit judges whether the EIT includes the first type access information,
when the judgment unit judges that the EIT includes the first type access information, the playback unit accesses the first type stream with use of the first type access information, and
when the judgment unit judges that the EIT does not include the first type access information, the playback unit accesses the second type stream.

7. A reception and playback device that receives and plays back a distributed data stream for 2D display, the reception and playback device comprising:
a stream reception unit configured to receive a data stream to be received and played back that is selected via a user's operation;
an information reception unit configured to receive simulcast judgment information for judging whether a 2D stream and a 3D stream are simulcast in the data stream;
a judgment unit configured to, when the stream reception unit receives the 3D stream selected as the data stream to be received and played back, judge whether the 2D stream corresponding to the selected 3D stream is simulcast with the selected 3D stream, with use of the simulcast judgment information; and
a playback unit configured to, when the judgment unit judges affirmatively, play back the simulcast 2D stream, and when the judgment unit judges negatively, play back the 3D stream for 2D display, wherein
the simulcast judgment information is an EIT (Event Information Table) corresponding to the 3D stream included in an MPEG2-TS compliant data stream,
when the 2D stream and the 3D stream are simulcast, the EIT includes 2D access information relating to access to the simulcast 2D stream and 3D access information relating to access to the simulcast 3D stream,
the judgment unit judges whether the EIT includes the 2D access information,
when the judgment unit judges that the EIT includes the 2D access information, the playback unit accesses the 2D stream with use of the 2D access information, when the judgment unit judges that the EIT does not include the 2D access information, the playback unit accesses the 3D stream with use of the 3D access information, before judging whether the EIT includes the 2D access information, the judgment unit judges whether frames of the 3D stream are each composed of a single-viewpoint image or a multi-viewpoint image, when the judgment unit judges that the frames of the 3D stream are each composed of the single-viewpoint image, the playback unit plays back the 3D stream for 2D display irrespective of whether the 2D stream is simulcast with the 3D stream, the information reception unit receives 2D event information and 3D event information respectively included in the 2D stream and the 3D stream, the 2D event information being the simulcast judgment information, and the 3D stream being defined by a standard different from a standard defining the 2D stream, the 2D event information includes the 3D access information relating to the access to the simulcast 3D stream, the 3D event information includes the 2D access information relating to the access to the simulcast 2D stream and attribute information of the 3D stream, in the 3D event information, the attribute information of the 3D stream is located after the 2D access information, in the data stream, the 3D event information is located after the 2D event information, and the 2D access information and the 3D access information relate to a same program in terms of content.

8. A transmission method for use in a transmission device including a storage unit that stores therein first type event information and second type event information respectively included in a first type stream and a second type stream that are simulcast in a data stream, the second type stream being defined by a standard different from a standard defining the first type stream, the transmission method comprising:

a transmission step of transmitting the first type stream and the second type stream, wherein the first type event information includes second type access information relating to access to the second type stream, the second type event information includes first type access information relating to access to the first type stream and attribute information of the second type stream, in the second type event information, the attribute information of the second type stream is located after the first type access information, in the data stream, the second type event information is located after the first type event information, the first type access information and the second type access information relate to a same program in terms of content, the first type stream is a stream having a resolution of full HD and the second type stream is a stream having a resolution higher than the resolution of full HD, and the second type event information refers to the first type event information to establish event sharing between a first type event corresponding to the first type stream and a second type event corresponding to the second type stream.

9. A reception and playback method for use in a reception and playback device that receives and plays back a distributed data stream with a resolution of full HD, the reception and playback method comprising:

a stream reception step of receiving a data stream to be received and played back that is selected via a user's operation;

an information reception step of receiving (i) simulcast judgment information for judging whether a first type stream having the resolution of full HD and a second type stream having a resolution higher than the resolution of full HD are simulcast in the data stream, the second type stream being defined by a standard different from a standard defining the first type stream, and (ii) first type event information and second type event information respectively included in the first type stream and the second type stream, the second type event information being the simulcast judgment information;

a judgment step of, when the stream reception step receives the second type stream selected as the data stream to be received and played back, judging whether the first type stream corresponding to the selected second type stream is simulcast with the selected second type stream, with use of the simulcast judgment information; and a playback step of, when the judgment step judges affirmatively, playing back the simulcast first type stream with the resolution of full HD, and when the judgment step judges negatively, playing back the second type stream with the resolution of full HD, wherein the first type event information includes second type access information relating to access to the second type stream, the second type event information includes first type access information relating to access to the first type stream and attribute information of the second type stream, in the second type event information, the attribute information of the second type stream is located after the first type access information, in the data stream, the second type event information is located after the first type event information, the first type access information and the second type access information relate to a same program in terms of content, when the judgment unit judges affirmatively, the playback unit accesses the first type stream with use of the first type access information included in the second type event information, and when the judgment unit judges negatively, the playback unit accesses the second type stream with use of the second type access information included in the first type event information.

* * * * *